US008483041B2

(12) United States Patent
Lee et al.

(10) Patent No.: US 8,483,041 B2
(45) Date of Patent: Jul. 9, 2013

(54) METHODS AND SYSTEMS FOR STICKY REGION ALLOCATION IN OFDMA COMMUNICATION SYSTEMS

(75) Inventors: Chun Woo Lee, San Ramon, CA (US); Doo Seok Kim, Pleasanton, CA (US); Je Woo Kim, Cupertino, CA (US)

(73) Assignee: Qualcomm Incorporated, San Diego, CA (US)

( * ) Notice: Subject to any disclaimer, the term of this patent is extended or adjusted under 35 U.S.C. 154(b) by 227 days.

(21) Appl. No.: 12/137,540

(22) Filed: Jun. 12, 2008

(65) Prior Publication Data

US 2009/0310477 A1    Dec. 17, 2009

(51) Int. Cl.
*H04J 11/00* (2006.01)

(52) U.S. Cl.
USPC ........... 370/208; 370/310; 370/328; 370/329; 370/330; 455/403; 455/422.1; 455/450

(58) Field of Classification Search
USPC ............................ 370/203–211; 375/259–260
See application file for complete search history.

(56) References Cited

U.S. PATENT DOCUMENTS

| | | | | |
|---|---|---|---|---|
| 6,466,544 | B1 * | 10/2002 | Sen et al. ....................... | 370/231 |
| 2005/0249142 | A1 | 11/2005 | Kim et al. | |
| 2006/0007849 | A1 | 1/2006 | Kim et al. | |
| 2007/0058523 | A1 * | 3/2007 | Cho et al. ...................... | 370/208 |
| 2007/0206561 | A1 | 9/2007 | Son et al. | |
| 2008/0031128 | A1 | 2/2008 | Jang et al. | |
| 2008/0062944 | A1 * | 3/2008 | Smith et al. ................... | 370/342 |
| 2008/0095037 | A1 * | 4/2008 | Chang et al. .................. | 370/204 |
| 2008/0102848 | A1 | 5/2008 | Jung et al. | |
| 2008/0170490 | A1 * | 7/2008 | Connors et al. ............... | 370/203 |
| 2008/0175215 | A1 * | 7/2008 | Oh et al. ........................ | 370/338 |
| 2008/0186886 | A1 * | 8/2008 | Cho et al. ...................... | 370/310 |
| 2009/0075667 | A1 | 3/2009 | Bourlas | |
| 2009/0310543 | A1 | 12/2009 | Kim et al. | |
| 2010/0103886 | A1 | 4/2010 | Chun et al. | |
| 2010/0165908 | A1 | 7/2010 | Mun et al. | |

FOREIGN PATENT DOCUMENTS

| | | |
|---|---|---|
| CN | 1741636 A | 3/2006 |
| CN | 101141175 A | 3/2008 |
| EP | 1213871 A1 * | 6/2002 |
| EP | 1811730 A1 | 7/2007 |
| WO | WO2008056774 A1 | 5/2008 |

OTHER PUBLICATIONS

Lei Wang, Brian Gieschen, OFDM Frame Structure, IEEE 802.16 Broadband Wireless Access Working Group, <http://ieee802.org/16>, Jan. 11, 2002.*

(Continued)

*Primary Examiner* — Charles C Jiang
(74) *Attorney, Agent, or Firm* — Charles Chesney

(57) ABSTRACT

Methods and apparatus for allocating a data region (termed "sticky region allocation") in an orthogonal frequency-division multiplexing (OFDM) or orthogonal frequency division multiple access (OFDMA) frame so that a user terminal can receive/send data bursts for multiple OFDM/OFDMA frames, rather than inserting a MAP information element (MAP IE) for each user terminal in every frame, are provided. In this manner, the size of the control overhead, such as the downlink (DL) and uplink (UL) MAP messages, may be reduced. The reduced control overhead may increase the frame resources available for data traffic and thus, may boost the overall efficiency and performance of wireless systems using OFDM/OFDMA.

65 Claims, 18 Drawing Sheets

OTHER PUBLICATIONS

"IEEE DRAFT Standard for Local and metropolitan area networks—Part 16: Air Interface for Broadband Wireless Access System. 802.16Rev2/D5" IEEE Draft Standard For Local And Metropolitan Area Networks, Jun. 6, 2008, p. 1-910, XP002553171 pp. 790-797.

International Search Report and Written Opinion—PCT/US2009/047119—International Search Authority, European Patent Office, Nov. 18, 2009.

"Broadband Radio Access Networks (BRAN); HIPERACCESS Functional Specification Part 2—Data Link Control (DLC) layer; DTS/BRAN-0030002" ETSI Standards, LIS, Sophia Antip0lis Cedex, France, No. VO.c, Aug. 1, 2001, XP014036956 ISSN: 0000-000110. Initialization.

Jianmin Lu et al., "Persistent allocation" IEEE C802.16MAINT-08/056R3, Jan. 18, 2008, pp. 1-9, XP002553170 pp. 2-5.

3GPP TR 25.814 V7.1.0, Technical Report, "3rd Generation Partnership Project, Technical Specification Group Radio Access Network, Physical layer aspects for evolved Universal Terrestrial Radio Access (UTRA) (Release 7)", 3GPP TR 25.814 V7.1.0, [Online] vol. 25.814, No. V7.1.0, Sep. 1, 2006, pp. 1-133.

Xu H., et al., "Persistent Scheduling—Change Indicator", IEEE C802.16maint-08/189r3, May 14, 2008, pp. 1-10.

Yanover V., et al., "Persistent Allocations—clarifications", IEEE C802.16maint-08/205, Apr. 19, 2008, pp. 1-4.

\* cited by examiner

| FCH(DLFP)_Message_Format | |
|---|---|
| Used SCH bitmap: A bitmap indicating which groups of SCH are used on the 1st PUSC zone and on PUSC zones in which 'use all SC' indicator is set to '0' in STC_DL_Zone_IE0. Value 1 means used by this segment and 0 means not used.<br>　　　　　　　　　　 2048　　　 1024　　　 512　　　 128<br>bit 0: SCH Group 0　 0~11(12)　 0~ 5(6)　 0~4(5)　 0(1)<br>bit 1: SCH Group 1　 12~19( 8)　 6~ 9(4)　 NA　　 NA<br>bit 2: SCH Group 2　 20~31(12)　 10~15(6)　 5~9(5)　 1(1)<br>bit 3: SCH Group 3　 32~39( 8)　 16~19(4)　 NA　　 NA<br>bit 4: SCH Group 4　 40~51(12)　 20~25(6)　 10~14(5)　 2(1)<br>bit 5: SCH Group 5　 52~59( 8)　 26~29(4)　 NA　　 NA | 6 bits |
| Reserved: set to 0 | 1 bit |
| Repetition Coding Indication: on DL Map<br>No additional Rep=total1(0), 1 additional Rep=total2(1),<br>3 additional Rep=total4(2), 5 additional Rep=total6(3) | 2 bits |
| Coding Indication: on DL Map<br>DL Map shall be transmitted with QPSK at FEC rate 1/2<br>The BS ensures that DL Map (and other MAC msg required for SS operation) are sent with the mandatory coding scheme often enough to ensure uninterrupted operation of SS supporting only the mandatory coding scheme.<br><br>CC(0), BTC(1), CTC(2), ZTCC(3), CC w oINT(4), LDPC(5) | 3 bits |
| DL Map Length:<br>Defines the length in slots of the DL Map msg that follows immediately the DLFP, after repetition code is applied. | 8 bits |
| Reserved: set to 0 | 4 bits |

FIG. 4B

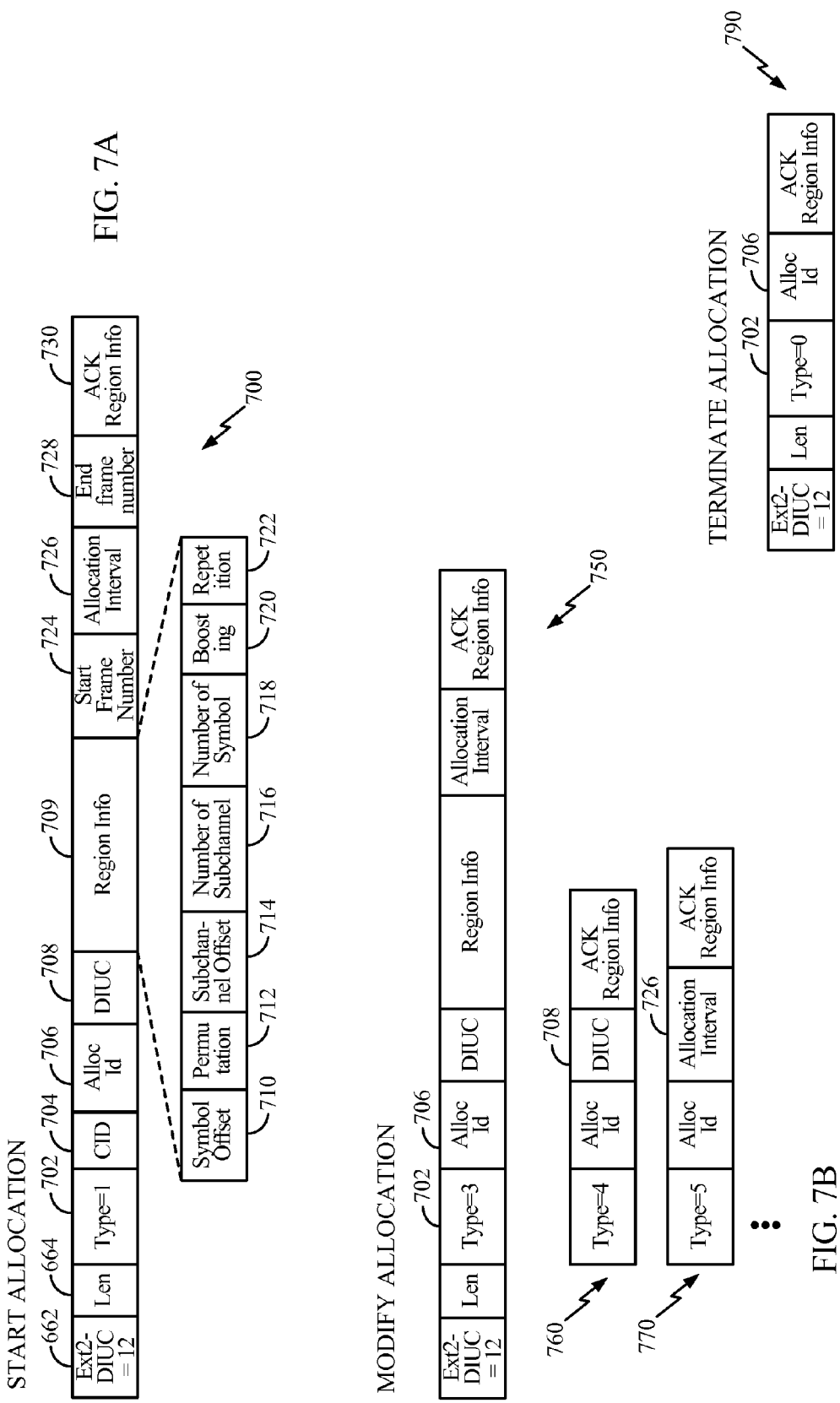

METHODS AND SYSTEMS FOR STICKY REGION ALLOCATION IN OFDMA COMMUNICATION SYSTEMS

TECHNICAL FIELD

Certain embodiments of the present disclosure generally relate to wireless communication and, more particularly, to the control overhead of MAP information elements (MAP IEs) in orthogonal frequency division multiple access (OFDMA) frames.

BACKGROUND

Orthogonal frequency-division multiplexing (OFDM) and OFDMA wireless communication systems under IEEE 802.16 use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station emits and receives radio frequency (RF) signals that convey data to and from the mobile stations. Such an RF signal from a base station includes an overhead load, in addition to the data load (voice and other data), for various communication management functions. Each mobile station processes the information in the overhead load of each received signal prior to processing the data.

Under the current versions of the IEEE 802.16x standard for the OFDMA systems, every downlink subframe from a base station includes a preamble, a frame control header (FCH) following the preamble, and a downlink map (DL-MAP) following the FCH as part of the overhead load. The preamble includes information for searching a cell and a cell sector within a cell and for synchronizing a mobile station in both time and frequency with the received downlink signal. The FCH portion of the downlink subframe includes 24 bits with information on the downlink transmission format (e.g., the DL-MAP) and control information for the downlink data reception (e.g., allocation of the subcarriers in the current downlink frame). The DL-MAP specifies downlink data region allocation and burst profile information so that the DL data bursts in the OFDM/OFDMA frame may be correctly decoded. The first DL data burst is typically an uplink map (UL-MAP) containing similar allocation and burst profile information for uplink transmissions on a per-frame basis, which may also be considered as part of the control overhead.

The control overhead consumes both time and frequency resources in an OFDMA frame, and the control messages grow with the number of concurrent users (e.g., mobile stations) supported by a base station. Because these time and frequency resources are limited on a per-frame basis, greater consumption of these resources by the control overhead means there are fewer resources for data traffic. Moreover, because most control messages are encoded with the lowest coding rate so that these messages may be received by as many mobile stations as possible, a small increase in the size of the control messages leads to a considerably larger increase in the consumption of the frame resources. As a result, maximum data throughput of a mobile station will decrease exponentially as the number of concurrent users increases.

SUMMARY

Certain embodiments of the present disclosure generally relate to locating a burst within an orthogonal frequency division multiple access (OFDMA) frame without a MAP information element (MAP IE) in every OFDMA frame such that the control overhead may be reduced.

Certain embodiments of the present disclosure provide a method. The method generally includes receiving a first signal based on a first OFDMA frame; locating a data region in the first OFDMA frame according to a first MAP IE; receiving a second signal based on a second OFDMA frame, wherein the second signal is received later than the first signal; and locating the data region in the second OFDMA frame without using a second MAP IE.

Certain embodiments of the present disclosure provide a receiver for wireless communication. The receiver generally includes logic configured to locate a data region in a first OFDMA frame of a first signal received by the receiver according to a first MAP IE and configured to locate, without using a second MAP IE, the data region in the second OFDMA frame of a second signal received by the receiver, wherein the second signal is received later than the first signal.

Certain embodiments of the present disclosure provide an apparatus for wireless communication. The apparatus generally includes means for receiving a first signal based on a first OFDMA frame; means for locating a data region in the first OFDMA frame according to a first MAP IE; means for receiving a second signal based on a second OFDMA frame, wherein the second signal is received later than the first signal; and means for locating the data region in the second OFDMA frame without using a second MAP IE.

Certain embodiments of the present disclosure provide a mobile device. The mobile device generally includes a receiver front end for receiving a first signal based on a first OFDMA frame and a second signal based on a second OFDMA frame, wherein the second signal is received later than the first signal; and logic configured to locate a data region in the first OFDMA frame according to a first MAP IE and configured to locate the data region in the second OFDMA frame without using a second MAP IE.

Certain embodiments of the present disclosure provide a computer-readable medium containing a program for locating a data region in multiple OFDMA frames, which, when executed by a processor, performs certain operations. The operations generally include receiving a first signal based on a first OFDMA frame; locating a data region in the first OFDMA frame according to a first MAP IE; receiving a second signal based on a second OFDMA frame, wherein the second signal is received later than the first signal; and locating the data region in the second OFDMA frame without using a second MAP IE.

Certain embodiments of the present disclosure provide a method. The method generally includes transmitting a first signal based on a first OFDMA frame having a MAP IE for locating a data region in a starting OFDMA frame; and transmitting a second signal based on a second OFDMA frame without a MAP IE for locating the data region in the second OFDMA frame, wherein the second signal is transmitted later than the first signal and a signal based on the starting OFDMA frame.

Certain embodiments of the present disclosure provide a transmitter for wireless communication. The transmitter generally includes logic configured to transmit a first signal based on a first OFDMA frame having a MAP IE for locating a data region in a starting OFDMA frame and configured to transmit a second signal based on a second OFDMA frame without a MAP IE for locating the data region in the second OFDMA frame, wherein the second signal is transmitted later than the first signal and a signal based on the starting OFDMA frame.

Certain embodiments of the present disclosure provide an apparatus for wireless communication. The apparatus generally includes means for transmitting a first signal based on a first OFDMA frame having a MAP IE for locating a data region in a starting OFDMA frame; and means for transmitting a second signal based on a second OFDMA frame without a MAP IE for locating the data region in the second OFDMA frame, wherein the second signal is transmitted later than the first signal and a signal based on the starting OFDMA frame.

Certain embodiments of the present disclosure provide a mobile device. The mobile device generally includes logic configured to generate a first OFDMA frame having a MAP IE for locating a data region in a starting OFDMA frame and configured to create a second OFDMA frame without a MAP IE for locating the data region in the second OFDMA frame; and a transmitter front end for transmitting a first signal based on the first OFDMA frame, a second signal based on the second OFDMA frame, and a signal based on the starting OFDMA frame, wherein the second signal is transmitted later than the first signal and the signal based on the starting OFDMA frame.

Certain embodiments of the present disclosure provide a computer-readable medium containing a program for transmitting multiple OFDMA frames, which, when executed by a processor, performs certain operations. The operations generally include transmitting a first signal based on a first OFDMA frame having a MAP IE for locating a data region in a starting OFDMA frame; and transmitting a second signal based on a second OFDMA frame without a MAP IE for locating the data region in the second OFDMA frame, wherein the second signal is transmitted later than the first signal and a signal based on the starting OFDMA frame.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIGS. 4A and 4B illustrate an example OFDM/OFDMA frame for Time Division Duplex (TDD) and the format of the Frame Control Header (FCH) contained therein, the FCH including downlink Frame Prefix (DLFP) information, in accordance with certain embodiments of the present disclosure.

FIGS. 7A-C illustrate example DL-MAP IEs for sticky region allocation, in accordance with certain embodiments of the present disclosure.

DETAILED DESCRIPTION

Figure 1:
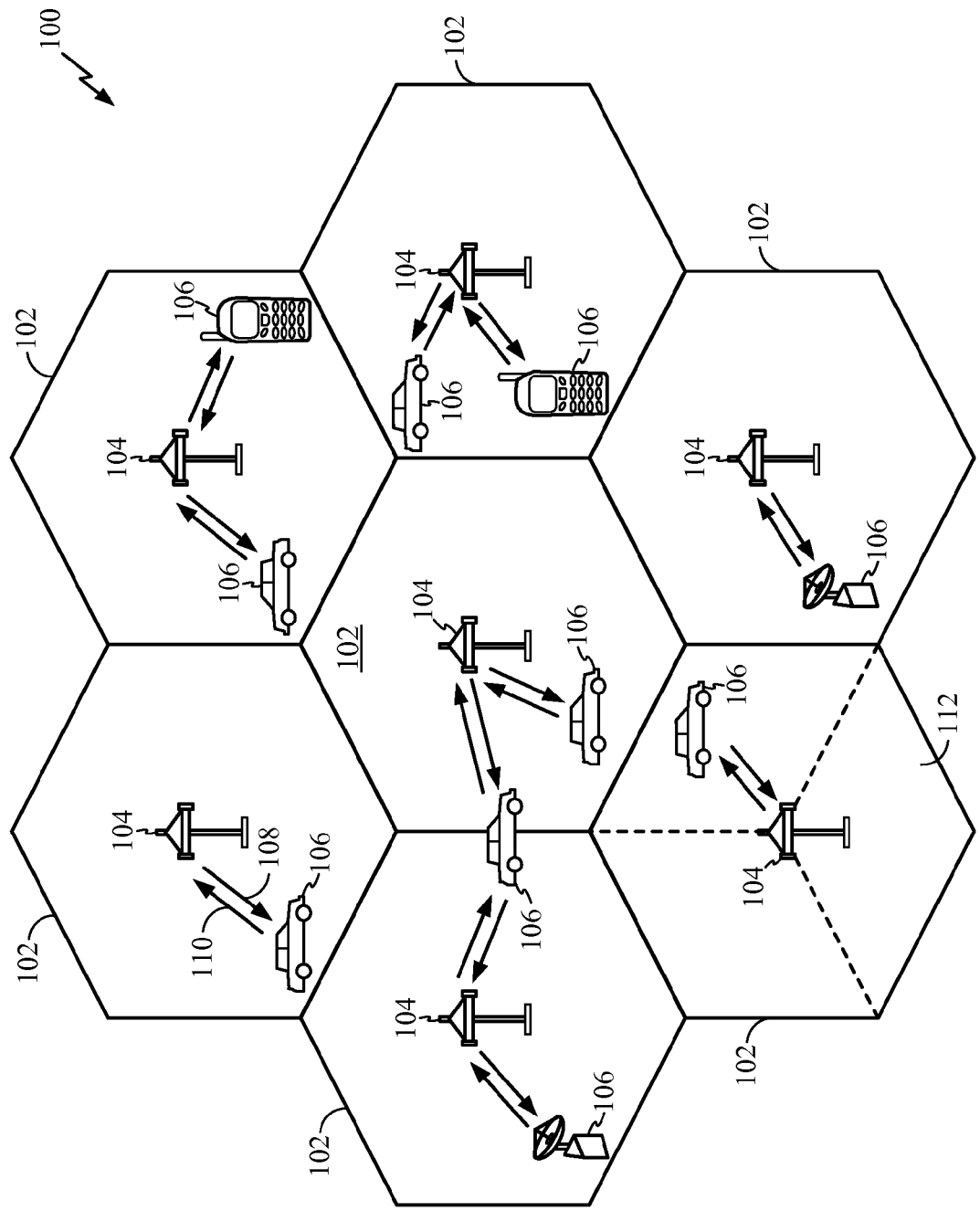
FIG. 1 illustrates an example wireless communication system, in accordance with certain embodiments of the present disclosure.

Certain embodiments of the present disclosure provide techniques and apparatus for allocating a data region (termed "sticky region allocation") in an orthogonal frequency-division multiplexing (OFDM) or orthogonal frequency division multiple access (OFDMA) frame so that a user terminal can receive/send data bursts for multiple OFDM/OFDMA frames, rather than inserting a MAP information element (MAP IE) for each user terminal in every frame. In this manner, the size of the control overhead, such as the downlink (DL) and uplink (UL) MAP messages, may be reduced, thereby increasing the frame resources available for data traffic and boosting the overall efficiency and performance of wireless systems using OFDM/OFDMA.

As used herein, a sticky region generally refers to a temporary fixed location within an OFDM/OFDMA frame occurring at a certain frame interval such that a mobile station can locate a data burst within certain frames without the base station having to transmit this location information in every OFDM/OFDMA frame.

Exemplary Wireless Communication System

The methods and apparatus of the present disclosure may be utilized in a broadband wireless communication system. The term "broadband wireless" refers to technology that provides wireless, voice, Internet, and/or data network access over a given area.

WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

Mobile WiMAX is based on OFDM (orthogonal frequency-division multiplexing) and OFDMA (orthogonal frequency division multiple access) technology. OFDM is a digital multi-carrier modulation technique that has recently found wide adoption in a variety of high-data-rate communication systems. With OFDM, a transmit bit stream is divided into multiple lower-rate substreams. Each substream is modulated with one of multiple orthogonal subcarriers and sent over one of a plurality of parallel subchannels. OFDMA is a multiple access technique in which users are assigned subcarriers in different time slots. OFDMA is a flexible multiple-access technique that can accommodate many users with widely varying applications, data rates, and quality of service requirements.

The rapid growth in wireless internets and communications has led to an increasing demand for high data rate in the field of wireless communications services. OFDM/OFDMA systems are today regarded as one of the most promising research areas and as a key technology for the next generation of wireless communications. This is due to the fact that OFDM/OFDMA modulation schemes can provide many advantages such as modulation efficiency, spectrum efficiency, flexibility, and strong multipath immunity over conventional single carrier modulation schemes.

IEEE 802.16x is an emerging standard organization to define an air interface for fixed and mobile broadband wireless access (BWA) systems, for example for fixed BWA systems and for mobile BWA systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
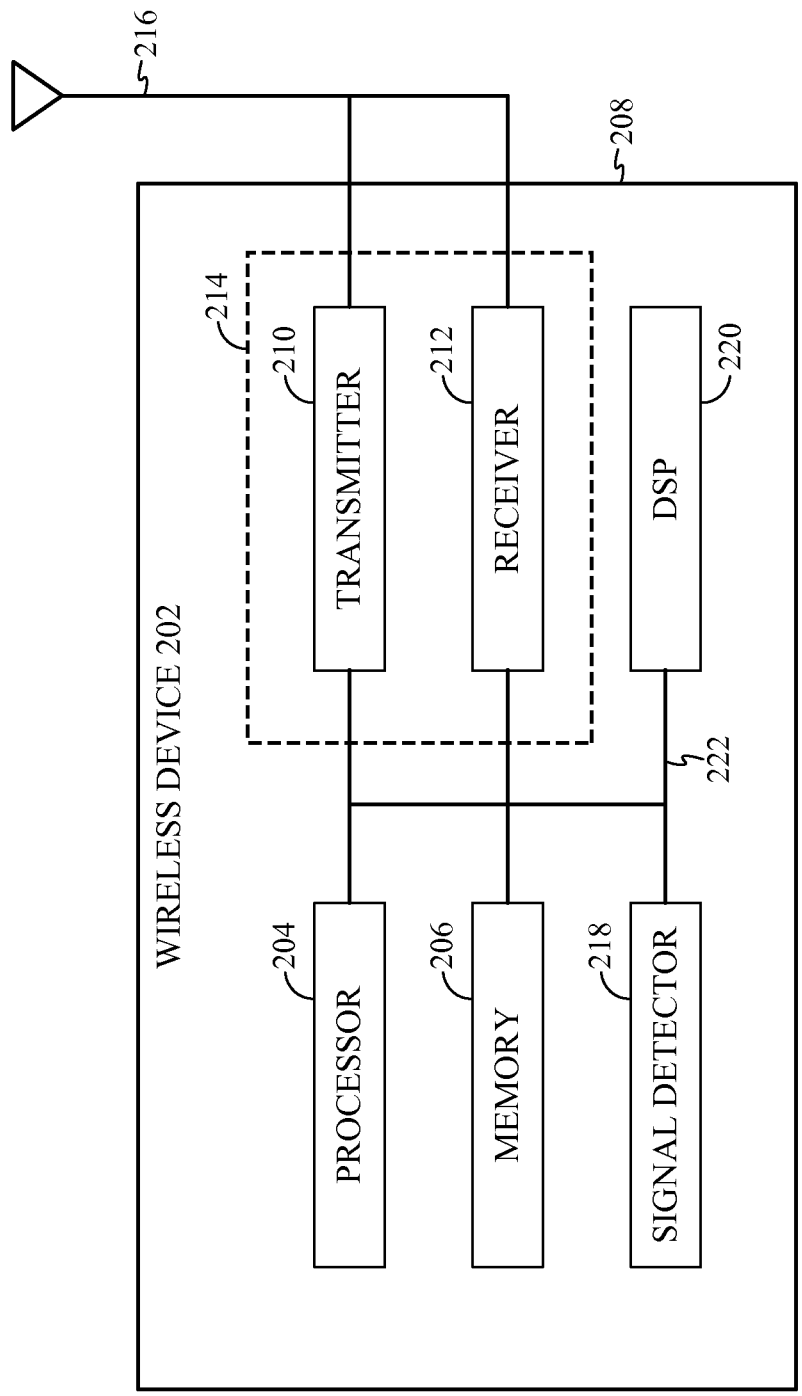
FIG. 2 illustrates various components that may be utilized in a wireless device in accordance with certain embodiments of the present disclosure.

FIG. 2 illustrates various components that may be utilized in a wireless device 202. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy from pilot subcarriers or signal energy from the preamble symbol, power spectral density, and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
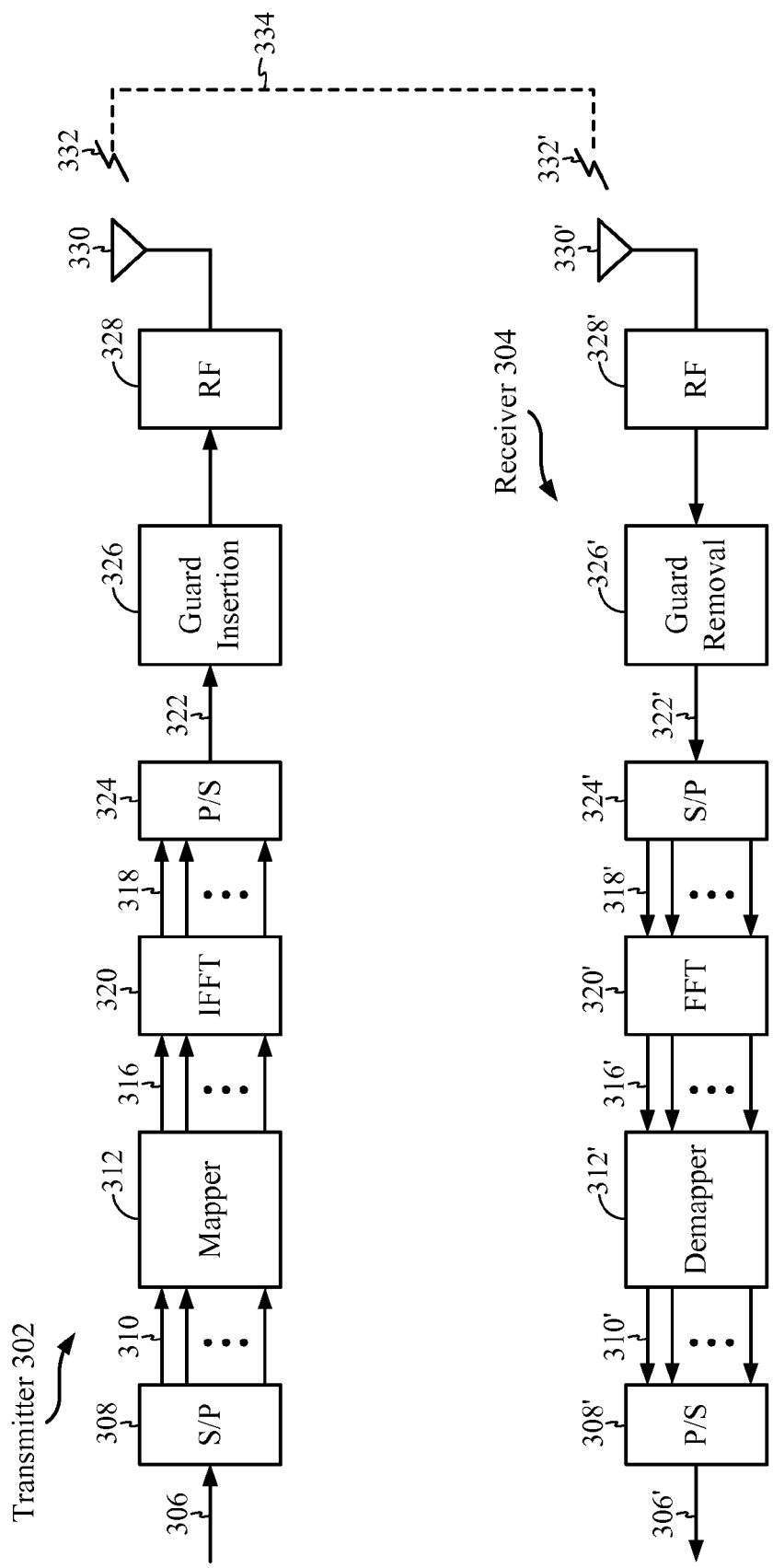
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. The N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless communication system 100 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312, thereby outputting N parallel data streams 310'. A P/S converter 308' may combine the N parallel data streams 310' into a single data stream 306'. Ideally, this data stream 306' corresponds to the data 306 that was provided as input to the transmitter 302.

Exemplary OFDM/OFDMA Frame

Figure 4A:
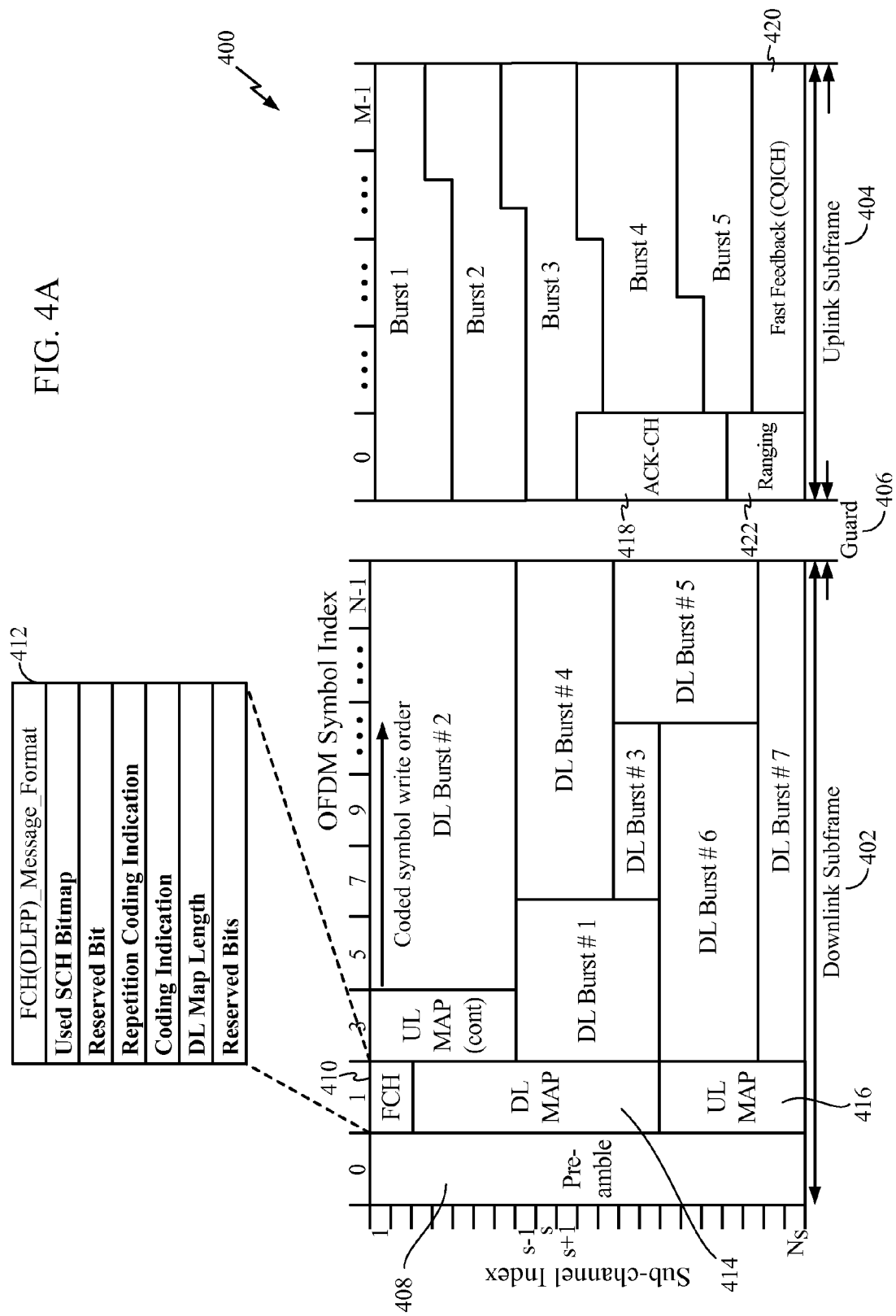

Referring now to FIG. 4A, an OFDM/OFDMA frame 400 for a Time Division Duplex (TDD) implementation is depicted as a typical, but not limiting, example. Other implementations of an OFDM/OFDMA frame, such as Full and Half-Duplex Frequency Division Duplex (FDD) may be used, in which case the frame is the same except that both downlink (DL) and uplink (UL) messages are transmitted simultaneously over different carriers. In the TDD implementation, each frame may be divided into a DL subframe 402 and a UL subframe 404, which may be separated by a small guard interval 406—or, more specifically, by Transmit/Receive and Receive/Transmit Transition Gaps (TTG and RTG, respectively)—in an effort to prevent DL and UL transmission collisions. The DL-to-UL-subframe ratio may be varied from 3:1 to 1:1 to support different traffic profiles.

Within the OFDM/OFDMA frame 400, various control information may be included. For example, the first OFDM/OFDMA symbol of the frame 400 may be a preamble 408, which may contain several pilot signals (pilots) used for synchronization. Fixed pilot sequences inside the preamble 408 may allow the receiver 304 to estimate frequency and phase errors and to synchronize to the transmitter 302. Moreover, fixed pilot sequences in the preamble 408 may be utilized to estimate and equalize wireless channels. The preamble 408 may contain BPSK-modulated carriers and is typically one OFDM symbol long. The carriers of the preamble 408 may be power boosted and are typically a few decibels (dB) (e.g., 9 dB) higher than the power level in the frequency domain of data portions in the WiMAX signal. The number of preamble carriers used may indicate which of the three segments of the zone are used. For example, carriers 0, 3, 6, . . . may indicate that segment 0 is to be used, carriers 1, 4, 7, . . . may indicate that segment 1 is to be used, and carriers 2, 5, 8, . . . may indicate that segment 2 is to be used.

A Frame Control Header (FCH) 410 may follow the preamble 408. The FCH 410 may provide frame configuration information, such as the usable subchannels, the modulation and coding scheme, and the MAP message length for the current OFDM/OFDMA frame. A data structure, such as the downlink Frame Prefix (DLFP) 412, outlining the frame configuration information may be mapped to the FCH 410.

As illustrated in FIG. 4B, the DLFP 412 for Mobile WiMAX may comprise six bits for the used subchannel (SCH) bitmap 412a, a reserved bit 412b set to 0, two bits for the repetition coding indication 412c, three bits for the coding indication 412d, eight bits for the MAP message length 412e, and four reserved bits 412f set to 0 for a total of 24 bits in the DLFP 412. Before being mapped to the FCH 410, the 24-bit DLFP may be duplicated to form a 48-bit block, which is the minimal forward error correction (FEC) block size.

Following the FCH 410, a DL-MAP 414 and a UL-MAP 416 may specify subchannel allocation and other control information for the DL and UL subframes 402, 404. In the case of OFDMA, multiple users may be allocated data regions within the frame, and these allocations may be specified in the DL and UL-MAP 414, 416. The MAP messages may include the burst profile for each user, which defines the modulation and coding scheme used in a particular link. Since MAP messages contain critical information that needs to reach all users, the DL and UL-MAP 414, 416 may often be sent over a very reliable link, such as BPSK or QPSK with rate ½ coding and repetition coding. The DL subframe 402 of the OFDM/OFDMA frame may include DL bursts of various bit lengths containing the downlink data being communicated. Thus, the DL-MAP 414 may describe the location of the bursts contained in the downlink zones and the number of downlink bursts, as well as their offsets and lengths in both the time (i.e., symbol) and the frequency (i.e., subchannel) directions.

Likewise, the UL subframe 404 may include UL bursts of various bit lengths composed of the uplink data being communicated. Therefore, the UL-MAP 416, transmitted as the first burst in the downlink subframe 402, may contain information about the location of the UL burst for different users. The UL subframe 404 may include additional control information as illustrated in FIG. 4A. The UL subframe 404 may include a UL ACK 418 allocated for the mobile station (MS) to feed back a DL hybrid automatic repeat request acknowledge (HARQ ACK) and/or a UL CQICH 420 allocated for the MS to feed back channel state information on the Channel Quality Indicator channel (CQICH). Furthermore, the UL subframe 404 may comprise a UL Ranging subchannel 422. The UL Ranging subchannel 422 may be allocated for the MS to perform closed-loop time, frequency, and power adjustment, as well as bandwidth requests. Altogether, the preamble 408, the FCH 410, the DL-MAP 414, and the UL-MAP 416 may carry information that enables the receiver 304 to correctly demodulate the received signal.

For OFDMA, different "modes" can be used for transmission in DL and UL. An area in the time domain where a certain mode is used is generally referred to as a zone. One type of zone is called DL-PUSC (downlink partial usage of subchannels) and may not use all the subchannels available to it (i.e., a DL-PUSC zone may only use particular groups of subchannels). There may be a total of six subchannel groups, which can be assigned to up to three segments. Thus, a segment can contain one to six subchannel groups (e.g., segment 0 contains three subchannel groups, segment 1 contains two, and segment 2 contains one subchannel group). Another type of zone is called DL-FUSC (downlink full usage of subchannels). Unlike DL-PUSC, DL-FUSC does not use any segments, but can distribute all bursts over the complete frequency range.

Exemplary DL-MAP and Exemplary DL-MAP IEs

Figure 5:
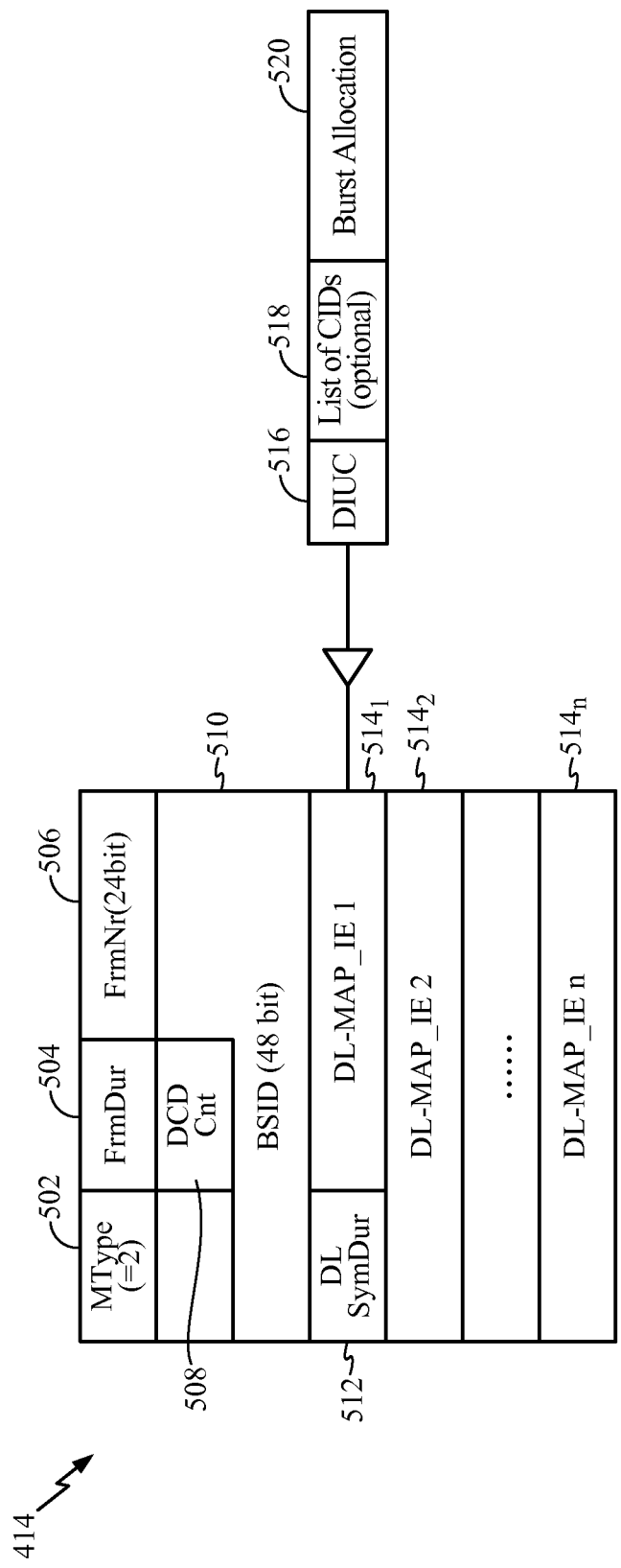
FIG. 5 illustrates the format of a downlink map (DL-MAP) message with a generic DL-MAP information element (IE), in accordance with certain embodiments of the present disclosure.

The DL-MAP 414 of FIG. 4A is illustrated in more detail in FIG. 5. The DL-MAP 414 may begin with a Management Message Type 502 having a length of 8 bits, which has a value of 2 ($00000010_b$) to indicate the control message is a DL-MAP. The Management Message Type 502 may be followed by a frame duration code 504, which is 8 bits long, and a frame number 506, which is 24 bits long. The frame number 506 may be followed by a Downlink Channel Descriptor (DCD) count 508 having a length of 8 bits and matching the DCD configuration change count value. The DCD message refers to physical and Media Access Control (MAC) layer-related parameters to be applied to each burst interval allocated to the downlink, which include a modulation type, a forward error correction (FEC) code type, and the like. The DCD count 508 may be followed by a base station identifier (BSID) 510, having a length of 6 bytes for a total length of 48 bits. The BSID 510 may uniquely identify the network base station and may be followed by a DL symbol duration 512 indicating a number of OFDMA symbols in the DL subframe 402 and having a length of 8 bits.

A number (n) of DL-MAP information elements (IEs) 514 having variable lengths may follow the DL symbol duration 512. A generic DL-MAP IE 514 may comprise a Downlink Interval Usage Code (DIUC) 516, a list of connection IDs 518, and the DL burst allocation 520 (e.g., subchannel offset, symbol offset, subchannel number, and symbol number) to define a downlink transmission. A DIUC 516 between 0 and 12 inclusive may indicate that the DL-MAP IE provides a DL burst profile (i.e., the modulation and coding scheme used in the burst), while a DIUC 516 of 14 or 15 may indicate that the DL-MAP IE is a control information element. A DIUC 516 of 13 may indicate that the DL-MAP IE is used for safety zones (i.e., gap) and peak-to-average-power ratio (PAPR) reduction. Although not shown in FIG. 5, some embodiments of the DL-MAP 414 may include padding having a length of 4 bits in an effort to reach a byte boundary for the DL-MAP 414.

Figure 6A:
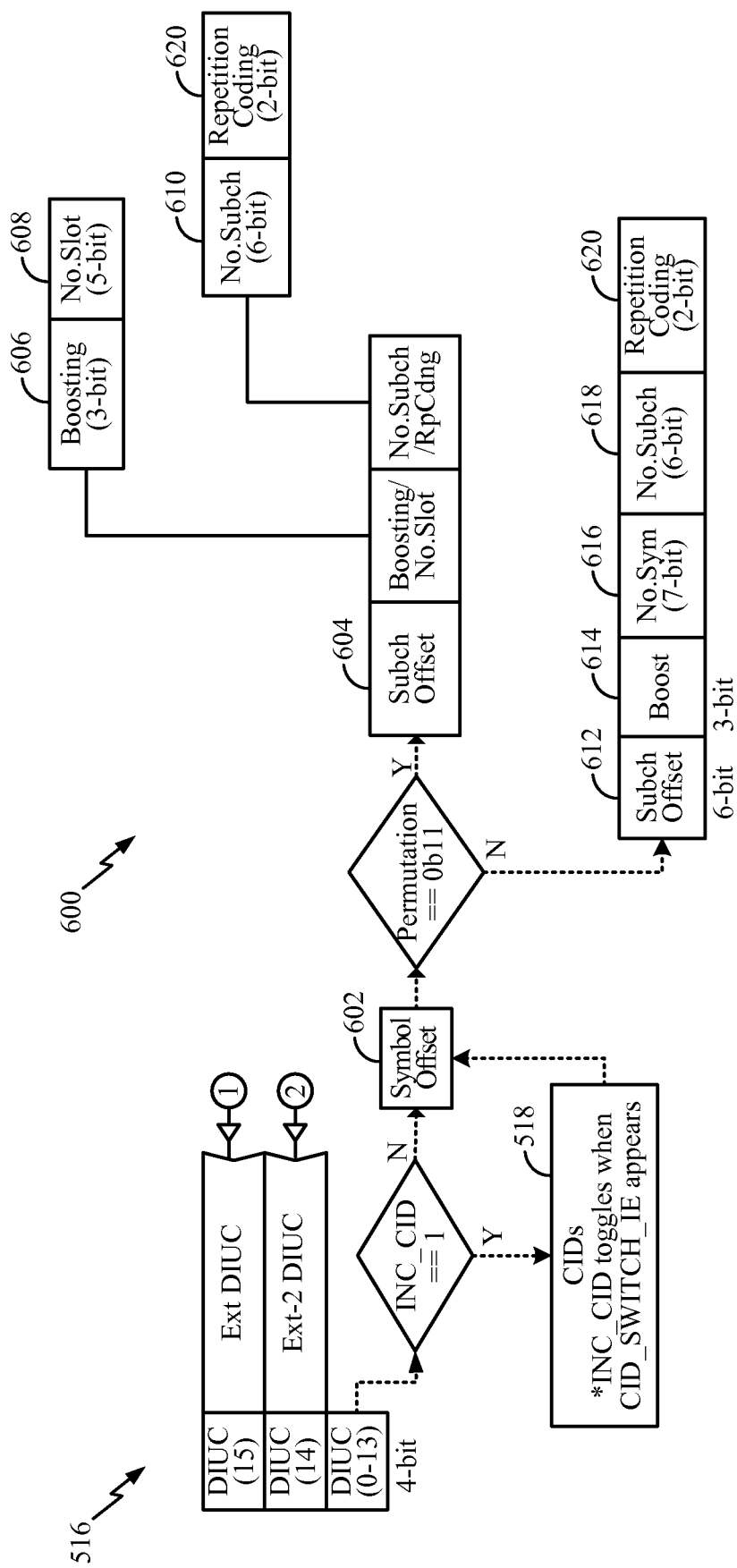
FIGS. 6A-C illustrate different types of DL-MAP IEs, in accordance with certain embodiments of the present disclosure.
Figure 6B:
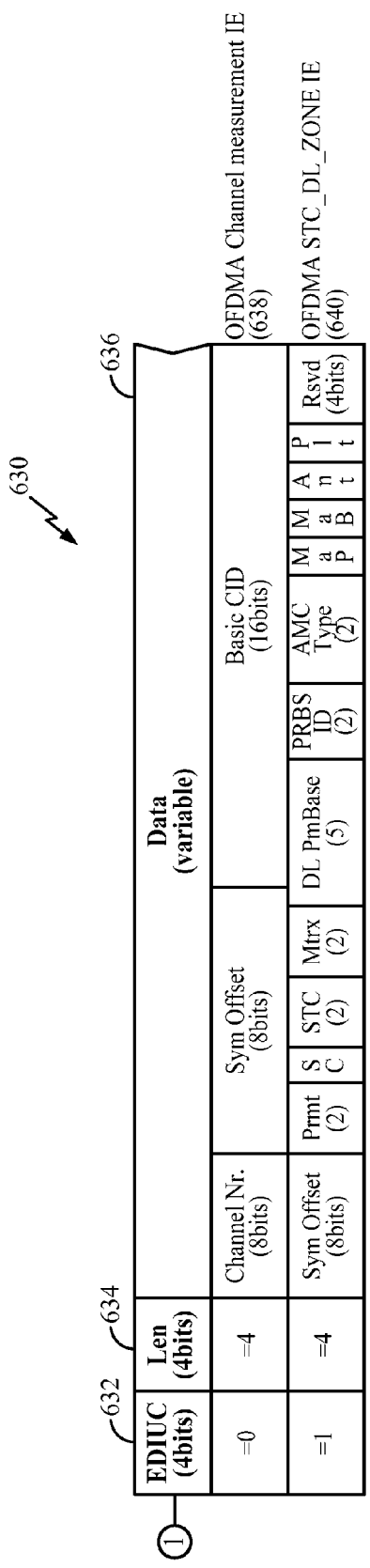
Figure 6C:
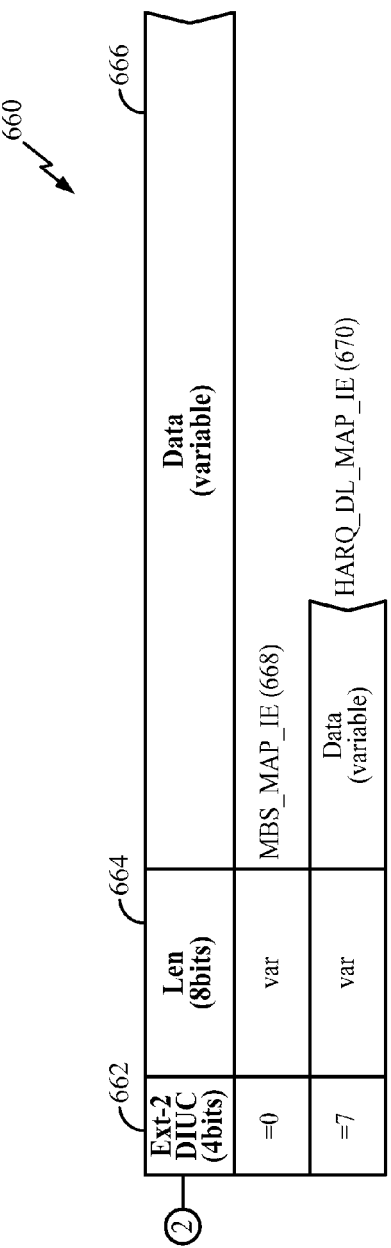

Referring now to FIGS. 6A-6C, examples of different types of DL-MAP IEs 514 are illustrated in greater detail. FIG. 6A illustrates DL-MAP IEs having DIUC 516 values equal to 15, 14, or 0-13. When the DIUC 516 has a value between 0 and 13 inclusive, the DL-MAP IE 600 of FIG. 6A may include a list of connection identifiers (CIDs) 518 depending on whether INC_CID (include CID) was toggled to a value of 1 by CID_SWITCH_IE. If INC_CID is equal to 1, then the DL-MAP IE 600 may have a value indicating the number of CIDs (N_CID) having a length of 8 bits and a corresponding number of CIDs assigned for this IE, each having a length of 16 bits. If INC_CID is equal to 0, then the DL-MAP IE 600 has a length of zero bits for the list of CIDs 518. Following the optional list of CIDs 518, the DL-MAP IE 600 may be composed of an OFDMA symbol offset 602 having a length of 8 bits.

Adaptive modulation and coding (AMC), also known as link adaptation, denotes matching of the modulation, coding, and other signal and protocol parameters to the conditions of the wireless channel (e.g. channel loss, receiver sensitivity, available transmitter power, and interference from other transmitters). Depending on the AMC scheme used, the DL-MAP IE 600 may have at least two different structures. If the AMC permutation is 2 bins by 3 symbols (2×3) or 1 bin by 6 symbols (1×6), then the DL-MAP IE 600 may be configured with the upper structure in FIG. 6A, with a subchannel offset 604 having a length of 8 bits, a boosting field 606 having a length of 3 bits, a number of OFDMA triple symbols field 608 having a length of 5 bits, and a number of subchannels field 610 having a length of 6 bits. Otherwise, the DL-MAP IE 600 may be configured with the lower structure in FIG. 6A, with a subchannel offset 612 having a length of 6 bits, a boosting field 614 having a length of 3 bits, a number of OFDMA symbols field 616 having a length of 7 bits, and a number of OFDMA subchannels field 618 having a length of 6 bits. The boosting fields 606, 614 may have various three-bit values indicating the boosting value, where $000_b$ indicates no boosting, $001_b$ indicates $^+6$ dB boosting, $010_b$ indicates $^-6$ dB boosting, $011_b$ indicates $^+9$ dB boosting, $100_b$ indicates $^+3$ dB boosting, $101_b$ indicates $^-3$ dB boosting, $110_b$ indicates $^-9$ dB boosting, and $111_b$ indicates $^-12$ dB boosting.

The DL-MAP IE 600 may then include a repetition coding indication 620 having a length of 2 bits. The repetition coding indication 620 may have various two-bit values indicating the repetition coding, where $00_b$ indicates no repetition coding, $01_b$ indicates repetition coding of 2 used, $10_b$ indicates repetition coding of 4 used, and $11_b$ indicates repetition coding of 6 used.

FIG. 6B illustrates a DL-MAP Extended IE 630. After the DIUC 516 having a 4-bit value of 15 ($1111_b$), the DL-MAP Extended IE 630 may have an Extended DIUC 632 having a length of 4 bits, a length field 634 having a length of 4 bits, and a data field 636 having various lengths according to the length field 634. Therefore, the DL-MAP Extended IE 630 may have a length of 12 bits plus the value in the length field 634. If the extended DIUC 632 is equal to 0, then the DL-MAP Extended IE 630 may be for an OFDMA channel measurement IE 638. If the Extended DIUC 632 is equal to 1, then the DL-MAP Extended IE 630 may be for an OFDMA STC_DL_ZONE IE 640 as illustrated.

FIG. 6C illustrates a DL-MAP Extended-2 IE 660. After the DIUC 516 having a 4-bit value of 14 ($1110_b$), the DL-MAP Extended IE 660 may have an Extended-2 DIUC 662 having a length of 4 bits, a length field 664 having a length of 4 bits, and a data field 666 having various lengths according to the length field 664. Therefore, the DL-MAP Extended-2 IE 660 may have a length of 16 bits plus the value in the length field 664. If the Extended-2 DIUC 662 is equal to 0, then the DL-MAP Extended-2 IE 660 may be for an MBS_MAP_IE 668. If the Extended-2 DIUC 662 is equal to 7 ($0111_b$), then the DL-MAP Extended-2 IE 660 may be for a HARQ_DL_MAP_IE 670 as illustrated.

Exemplary DL-MAP IE for Sticky Region Allocation

In an effort to reduce the size of the DL-MAP 414 in subsequent frames such that more frame resources can be used for data traffic, FIGS. 7A-C illustrate example DL-MAP IEs for sticky region allocation. FIG. 7A illustrates an example Start Allocation DL-MAP IE 700, which may be used to notify a mobile station of the allocated sticky region for obtaining a DL data burst intended for that particular mobile station. The Start Allocation DL-MAP IE 700 in FIG. 7A uses a DL-MAP Extended-2 IE 660 with a DIUC 516 equal to 14, although any suitable DL-MAP IE structure permitting incorporation of all of the information in the Start Allocation DL-MAP IE, such as a DL-MAP Extended IE 630 having a DIUC 516 equal to 15, may be used. The DIUC 516 of the Start Allocation DL-MAP IE 700 may be followed by an Extended-2 DIUC 662 having a value equal to 12 ($1100_b$), for example, to indicate this DL-MAP IE pertains to sticky region allocation and to convey the structure of the series of bits in the IE. Although an Extended-2 DIUC 662 equal to 12 is illustrated in FIG. 7A, any suitable value that does not specify another type of IE may be selected, whether for Extended or Extended-2 types of DL-MAP IEs. The Extended-2 DIUC 662 may be followed by a length field 664 as described above.

The Start Allocation DL-MAP IE 700 may follow the length field 664 with a type field 702 in an effort to specify the type of control for the sticky region allocation, which may divided into three main categories: starting the allocation, modifying the allocation, and terminating the allocation. A type field 702 equal to 1, for example, may specify that the sticky region allocation DL-MAP IE is a Start Allocation DL-MAP IE 700 as shown. The type field 702 may be followed by a connection identifier (CID) 704 to specify the owner mobile station(s) of the sticky region, and the CID 704 may be followed by an allocation ID 706 to identify the sticky region. By introducing the shorter allocation ID 706, the longer CID 704 need not be used in subsequent DL-MAP IEs modifying or terminating the sticky region allocation, thereby further reducing the size of the DL-MAP 414 in subsequent frames having a DL-MAP IE for this sticky region.

For the Start Allocation DL-MAP IE 700, the allocation ID 706 may be followed by any possible components useful in setting up the sticky region and providing enough information to the mobile station such that the MS does not require any additional information to locate the DL data burst in the sticky region unless something changes. The order of these components may be rearranged, and various combinations of these components may be used for sticky region allocation. For example, the allocation ID 706 may be followed by a DIUC 708, which may specify the modulation type used to transmit the DL data burst.

As illustrated in FIG. 7A, the DIUC 708 may be followed by region information 709, which may include various fields for describing the sticky region. For example, the region information 709 may include a symbol offset 710, which may be used to locate the start of the sticky region (i.e. the allocated DL data burst in an OFDM/OFDMA frame) according to the symbol index (i.e., in time). The symbol offset 710 may be followed by a permutation type 712, which may indicate the AMC permutation used for the DL data burst. The permutation type 712 may be followed by a subchannel offset 714, which may be used to locate the start of the sticky region according to the subchannel index (i.e., in frequency). The subchannel offset 714 may be followed by a number of subchannels 716 (to indicate the size of the sticky region in terms of subchannels) and a number of symbols 718 (to indicate the size of the sticky region in terms of symbols). The number of symbols 718 may be followed by a boosting level 720, which may indicate the discrete level of power boosting used for the DL data burst in the sticky region. As illustrated in FIG. 7A as an example, the boosting level 720 may be followed by a repetition coding type 722, which may indicate the repetition coding (e.g., no repetition, 2, 4, or 6) used for the DL data burst. The repetition coding type 722 may be the last field in the region information 709.

The region information 709 may be followed by a starting frame number 724, which may indicate in which OFDM/OFDMA frame the sticky region will first appear such that there is a DL data burst for the mobile station(s) listed in the CID 704 to decode. The starting frame number 724 may be followed by an allocation interval 726, which may specify the frequency of the appearance of the sticky region throughout the series of received frames. The allocation interval 726 may be followed by an ending frame number 728, which may indicate the end of the sticky region allocation and may specify the last OFDM/OFDMA frame in which the sticky region will appear. For some embodiments, the ending frame number 728 may specify the first OFDM/OFDMA frame in which the sticky region will not appear according to the allocation interval 726 or the frame immediately following the frame containing the last appearance of the sticky region. Some embodiments may not include an ending frame number 728 as a parameter in the Start Allocation DL-MAP IE 700 since another type of DL-MAP IE may be used to end the sticky region allocation.

The ending frame number 728 may be followed by acknowledgment (ACK) region information 730, which may specify how the mobile station is to provide acknowledgement of the sticky region allocation to the base station. The UL-MAP 416 in the current or in a future OFDMA frame may include a region allocation IE specifying the sticky region allocation ID and the corresponding ACK region information for the MS to send an acknowledgment. After receiving the ACK from the MS, the BS may start allocating the sticky region and transmitting accordingly. If the BS does not receive the ACK through the assigned UL region, the BS may retransmit the Start Allocation DL-MAP IE 700.

Referring now to FIG. 7B, any parameter or combination of parameters of the sticky region allocated by the Start Allocation DL-MAP IE 700 may be modified in any subsequent frame according to a Modify Allocation DL-MAP IE. However, some instances of sticky regions may not exercise a Modify Allocation DL-MAP IE if the sticky region allocation need not be adjusted from the start of the allocation to its termination.

One example DL-MAP IE for modifying the sticky region allocation is the Modify Allocation DL-MAP IE 750 in which all possible parameters of the sticky region allocation may be updated. The Modify Allocation DL-MAP IE 750 may have a type field 702 equal to 3, for example, to indicate the parameters of the sticky region which may be modified. For some embodiments, all of the parameters according to the type field 702 may be included, but the values contained within one or more particular parameters may remain unchanged from the Start Allocation DL-MAP IE or the previous Modify Allocation DL-MAP IE containing one or more of those particular parameters. Therefore, the Modify Allocation DL-MAP IE 750 may include all of the parameters from the Start Allocation DL-MAP IE 700 with the exception of the CID 704 (since the mobile station corresponding to the allocated sticky region should not change and is represented by the shorter allocation ID 706) and the starting and ending frame numbers 724, 728 (since these frame numbers should not change for an allocated sticky region) as illustrated in FIG. 7B.

Again, the Modify Allocation DL-MAP IE 750 may include ACK region information 730 in an effort to specify how the mobile station is to provide acknowledgement of the modified sticky region allocation to the base station. If the BS does not receive the ACK through the assigned UL region as described above, the BS may retransmit the Modify Allocation DL-MAP IE 750.

Although the Modify Allocation DL-MAP IE 750 could be used to modify any parameter or combination of parameters of the sticky region, the object of certain embodiments of the present disclosure is to reduce the size of the control overhead, such as the DL-MAP 414. Therefore, other shorter Modify Allocation DL-MAP IEs may be used to modify certain parameters or combinations of parameters according to the type field 702. For example, the Modify Allocation DL-MAP IE 760 of FIG. 7B may have a type field 702 equal to 4, for example, to indicate that only the DIUC 708 of the sticky region is to be modified. By including only the DIUC 516, the Extended-2 DIUC 662, the length field 664, the type field 702, the allocation ID 706, the DIUC 708, and the ACK region information 730 of the sticky region, the Modify Allocation DL-MAP IE 760 is considerably shorter than the Start Allocation DL-MAP IE 700 or a conventional DL-MAP IE containing all of the information for locating and decoding a DL data burst.

FIG. 7B illustrates yet another example of a Modify Allocation DL-MAP IE. An example similar to the short Modify Allocation DL-MAP IE 760, the Modify Allocation DL-MAP IE 770 may have a type field 702 equal to 5, for example, to indicate that only the allocation interval 726 of the sticky region is to be modified.

FIG. 7C illustrates a Terminate Allocation DL-MAP IE 790 for ending the sticky region allocation. The Terminate Allocation DL-MAP IE 790 may have a type field 702 equal to 0, for example, to indicate that the sticky region is to be terminated and that the allocation ID 706 may be canceled and no longer associated with the particular sticky region. Some embodiments may not employ the Terminate Allocation DL-MAP IE 790 since the ending frame number 728 in the Start Allocation DL-MAP IE 700 may be used to indicate when the sticky region allocation is to be terminated. For other embodiments, the Terminate Allocation DL-MAP IE 790 may be used to terminate the sticky region allocation earlier than originally proposed by the ending frame number 728. For some embodiments, the mobile station may decide that the sticky region allocation has been terminated if the mobile station decodes a non-sticky-region DL-MAP IE that points to a DL data burst in or overlapping a portion of the allocated sticky region.

As illustrated in FIG. 7C, the Terminate Allocation DL-MAP IE 790 may include ACK region information 730 in an effort to specify how the mobile station is to provide acknowledgement of the terminated sticky region allocation to the base station. If the BS does not receive the ACK through the assigned UL region as described above, the BS may retransmit the Terminate Allocation DL-MAP IE 790.

Exemplary Method for Interpreting a DL-MAP IE for Sticky Region Allocation

Figure 8:
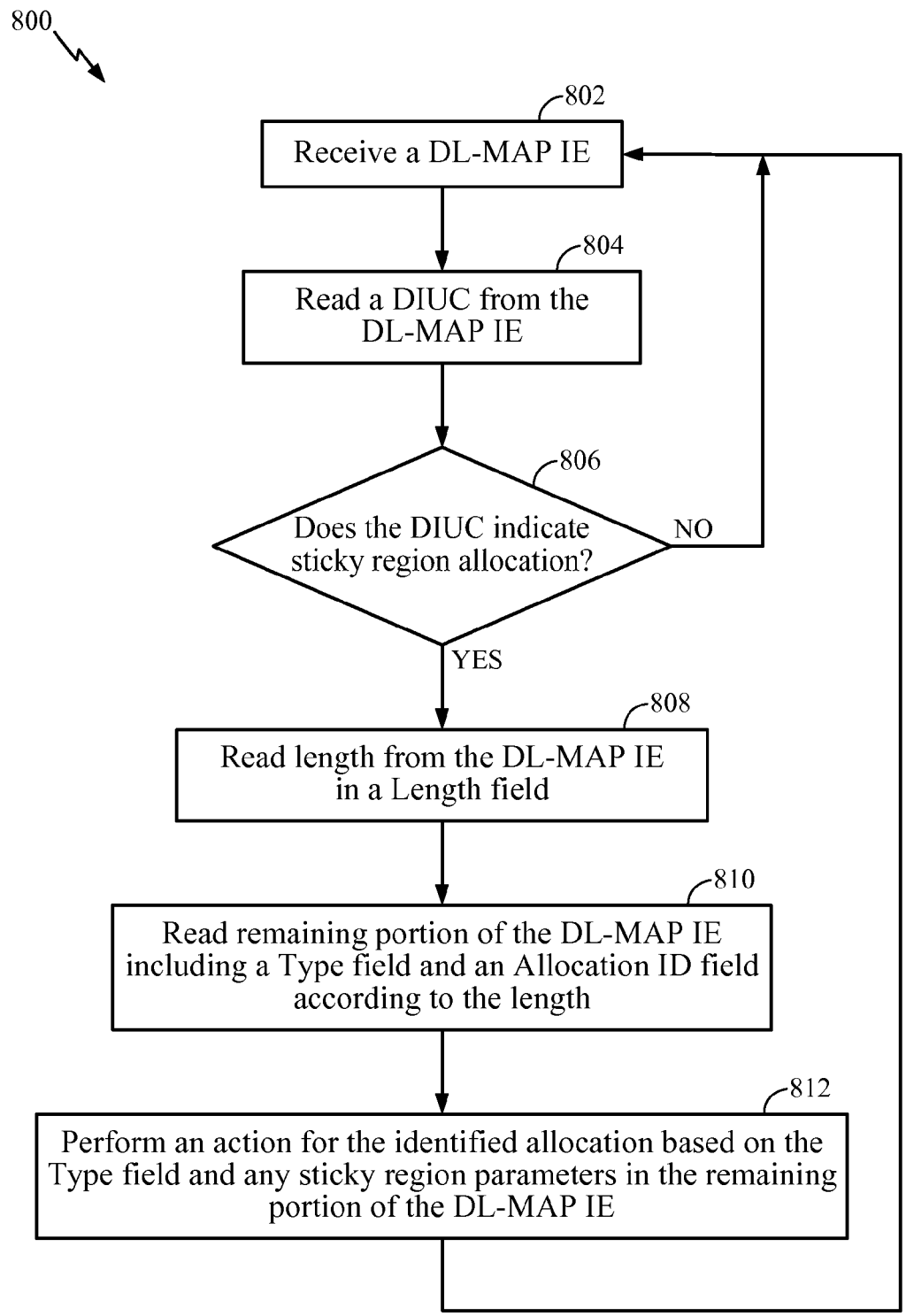
FIG. 8 is a flow chart of example operations for interpreting the DL-MAP IEs of FIGS. 7A-C, in accordance with certain embodiments of the present disclosure.

FIG. 8 is a flow chart of example operations 800 for interpreting DL-MAP IEs for sticky region allocation, such as the DL-MAP IEs of FIGS. 7A-C. The operations 800 begin, at 802, by receiving a DL-MAP IE 514 in a DL-MAP 414 of an OFDM/OFDMA frame 400. At 804, the DIUC 516 and possibly the Extended-2 DIUC 662 (or the Extended DIUC 632 for some embodiments) may be read.

If the DIUC values do not indicate sticky region allocation at 806, then the DL-MAP IE may be interpreted conventionally based on the DIUC 516, which is outside the scope of the operations 800, and the operations 800 may be repeated beginning at 802 with a new DL-MAP IE from the same frame or a different frame. It is worth mentioning here that all mobile stations may not support sticky region allocation, especially products from competitors. In such cases, a base station that supports sticky region allocation may be backwards compatible and may transmit one DL-MAP IE in each OFDM/OFDMA frame for each of the mobile stations that does not support sticky region allocation, as has been done conventionally. The base station may continue to use sticky region allocation for the mobile stations that support this overhead-reducing technique.

However, if the DIUC values indicate sticky region allocation (e.g., the DIUC 516 is equal to 14 and the Extended-2 DIUC 662 is equal to 12) at 806, then a length value may be read from a Length field (e.g., length field 664) at 808. At 810, a remaining portion of the sticky region DL-MAP IE may be read according to the length value. The remaining portion of the sticky region DL-MAP IE may include a type field 702 and an allocation ID 706 as described above. At 812, an action for the sticky region allocation identified by the allocation ID 706 may be performed based on the type field 702 and any sticky region parameters in the remaining portion of the sticky region DL-MAP IE (e.g., starting a sticky region allocation or modifying certain parameters of the allocated sticky region). The operations 800 may be repeated beginning at 802 with a new DL-MAP IE from the same or a different frame.

Exemplary Method of Operating with DL-MAP IEs for Sticky Region Allocation

Figure 9:
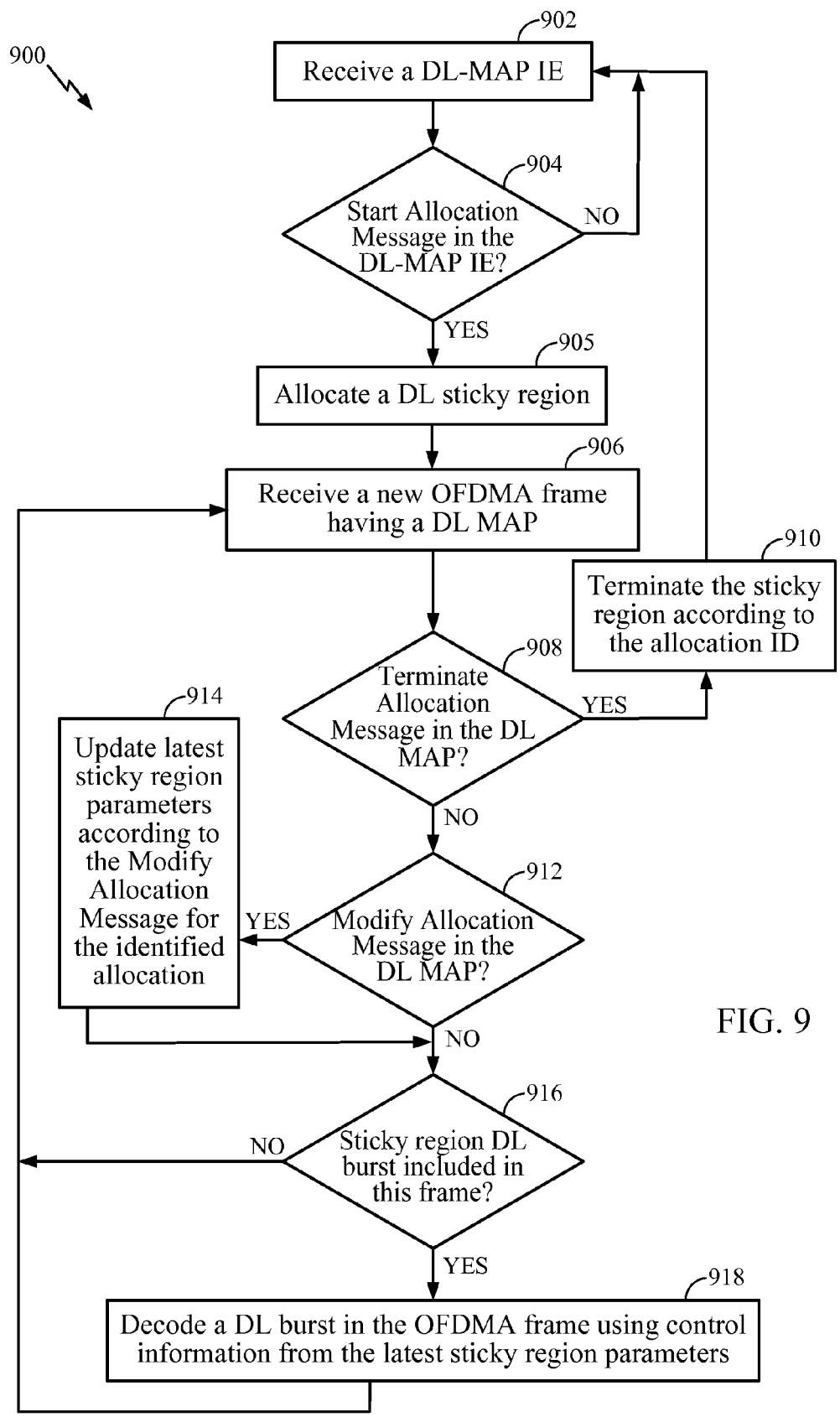
FIG. 9 is a flow chart of example operations for receiving multiple OFDMA frames and reading DL bursts with the use of DL-MAP IEs for sticky region allocation from the perspective of a mobile station (MS), in accordance with certain embodiments of the present disclosure.

Now that a method of interpreting a DL-MAP IE for sticky region allocation has been described, FIG. 9 is a flow chart of example operations 900 for receiving multiple OFDMA frames and decoding DL data bursts with the use of DL-MAP IEs for sticky region allocation from the perspective of a mobile station (MS). The operations 900 of FIG. 9 assume that a sticky region has not yet been allocated before the operations begin and are not concerned with reading conventional DL-MAP IEs for locating and decoding DL data bursts. As used herein, "locating a DL data burst" generally refers to finding the location of a DL data burst within the DL subframe 402. Furthermore, the operations 900 are only concerned with a single sticky region for clarity, although multiple sticky regions may be allocated with different starting and ending frame numbers.

The operations 900 begin, at 902, by receiving a DL-MAP IE 514 in a DL-MAP 414 of an OFDMA frame. If the DL-MAP IE 514 does not include a Start Allocation Message at 904, then the operations 900 may be repeated beginning at 902 with a new DL-MAP IE from the same frame or a different frame. However, if the DL-MAP IE 514 does include a Start Allocation Message (e.g. the Start Allocation DL-MAP IE 700) at 904, then a DL sticky region may be allocated at 905 according to the Start Allocation Message. Depending on the starting frame number 724, a DL data burst may be decoded in the same frame as the DL-MAP IE with the Start Allocation Message.

At 906, a new OFDMA frame with a new DL-MAP 414 may be received. If the DL-MAP includes a Terminate Allocation Message (e.g., the Terminate Allocation DL-MAP IE 790) in any of the DL-MAP IEs at 908, then the sticky region allocated at 905 may be terminated at 910 according to the allocation ID 706, for example, and the operations 900 may be repeated beginning at 902 with a new DL-MAP IE from the same frame or a different frame.

However, if the DL-MAP does not include a Terminate Allocation Message at 908 for the allocated sticky region, then the mobile station may determine if the DL-MAP includes a Modify Allocation Message in any of the DL-MAP IEs at 912. If the DL-MAP includes a Modify Allocation Message (e.g., the Modify Allocation DL-MAP IEs 750, 760, 770), then the parameters of the sticky region identified by the allocation ID 706, for example, may be updated according to the Modify Allocation Message.

Regardless of whether the DL-MAP included a Modify Allocation Message at 912, the mobile station may determine whether a sticky region DL data burst is included in the current OFDMA frame at 916. This may be determined based on the latest allocation interval 726 and, for some embodiments, may depend on the starting frame number 724 even when the allocation interval 726 is modified. If a DL data burst for the allocated sticky region is not included in this frame, then the operations 900 may repeat beginning at 906 with another new OFDMA frame. If a sticky region DL data burst is included in the current frame, then the DL data burst may be decoded at 918 using control information from the latest sticky region parameters, some of which may have been initialized at the start of the allocation and others which may have modified during wireless communication between the base station and the mobile station. After the sticky region DL data burst is decoded at 918, then the operations 900 may repeat beginning at 906 with another new OFDMA frame.

Once a sticky region has been allocated in the operations 900, the mobile station may continually locate and decode a sticky region DL data burst in the OFDMA frames without ever receiving another DL-MAP IE corresponding to that particular sticky region DL data burst. Even if the sticky region allocation is to be modified or terminated, the DL-MAP IEs instructing the mobile station to perform these actions may be considerably shorter than a conventional DL-MAP IE. In this manner, the DL-MAP IE for this DL data burst need not be repeated in every single OFDMA frame that contains this DL data burst. Therefore, the size of the DL-MAP 414 transmitted by the base station may be reduced, freeing up frame resources that can be used for data traffic in an effort to increase wireless communication efficiency and performance. Even a small reduction in the size of the DL-MAP 414 may have a significant impact on the available resources for data traffic since the DL-MAP may be transmitted at the lowest coding rate as described above.

Exemplary UL-MAP and Exemplary UL-MAP IEs

Figure 10A:
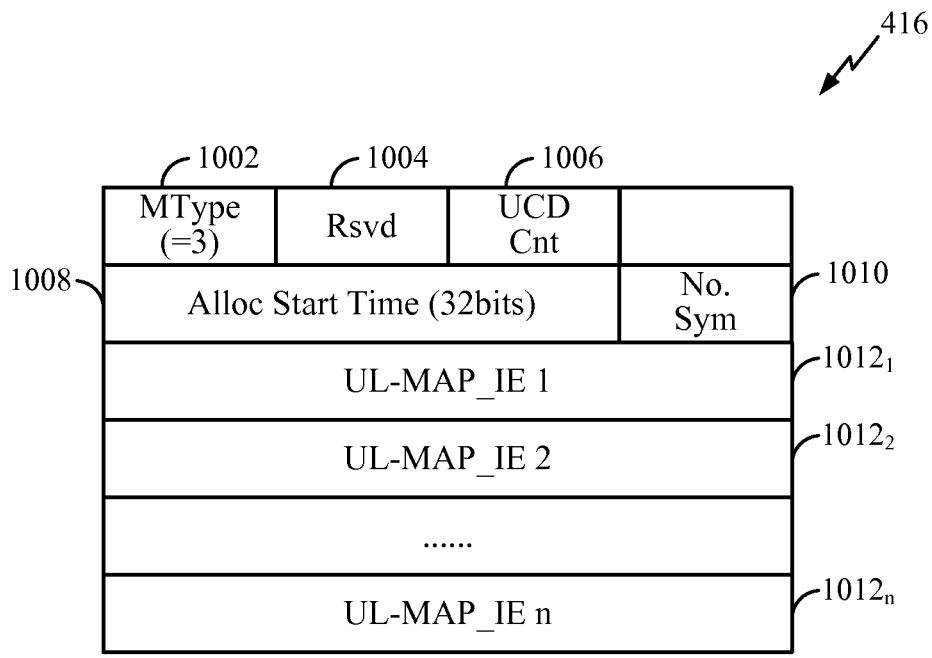
FIG. 10A illustrates the format of an uplink map (UL-MAP) message, in accordance with certain embodiments of the present disclosure.

The UL-MAP 416 of FIG. 4A is illustrated in more detail in FIG. 10A. The UL-MAP 416 may begin with a Management Message Type 1002 having a length of 8 bits, which has a value of 3 ($00000011_b$) to indicate the control message is a UL-MAP. The Management Message Type 1002 may be followed by 8 bits in a reserved field 1004. The reserved field 1004 may be followed by an Uplink Channel Descriptor (UCD) count 1006 having a length of 8 bits and matching the UCD configuration change count value. The UCD message refers to physical and Media Access Control (MAC) layer-related parameters to be applied to each burst interval allocated to the uplink, which include a modulation type, a forward error correction (FEC) code type, and the like. The UCD count 1006 may be followed by an allocation start time 1008 having a length of 32 bits and a number of symbols field 1010 indicating a number of OFDMA symbols in the UL subframe 404 and having a length of 8 bits.

A number (n) of UL-MAP information elements (IEs) 1012 having variable lengths may follow the number of symbols field 1010. A generic UL-MAP IE 1012 may comprise a connection identifier (CID) and an Uplink Interval Usage Code (UIUC) and may be used to define the uplink transmission. Although not shown in FIG. 10A, some embodiments of the UL-MAP 416 may include padding having a length of 4 bits in an effort to reach a byte boundary for the UL-MAP 416.

Figure 11:
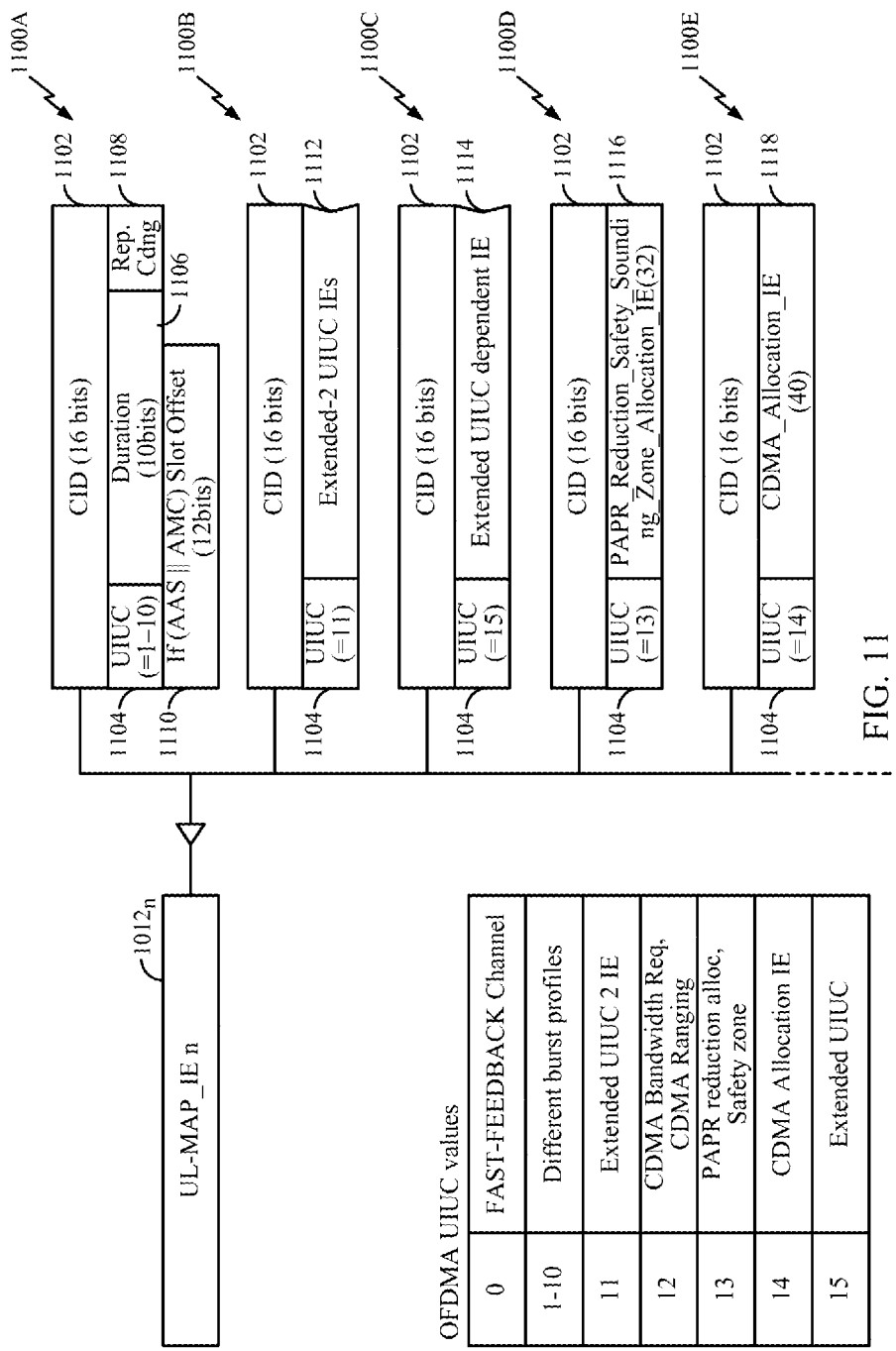
FIG. 11 illustrates different types of UL-MAP IEs and a table of OFDMA Uplink Interval Usage Code (UIUC) values, in accordance with certain embodiments of the present disclosure.

Referring now to FIG. 11, a UL-MAP IE 1012 may comprise a CID 1102 having a length of 16 bits. The CID 1102 may be followed by a UIUC 1104, which determines the usage for each CID 1102 according to the table of OFDMA UIUC values in FIG. 11, for example. The UL-MAP IE 1012 may have various lengths depending on the UIUC 1104, which has a length of 4 bits.

In a UL-MAP IE 1100A having a UIUC 1104 between 1 and 10 inclusive, the UL burst profile (e.g., modulation and coding scheme) may be indicated. As illustrated in FIG. 11, the UIUC 1104 may be followed by a duration 1106 having a length of 10 bits. Having units of OFDMA slots, the duration 1106 may be followed by a repetition coding indication 1108 having a length of 2 bits. The repetition coding indication 1108 may have various two-bit values indicating the repetition coding, where $00_b$ indicates no repetition coding, $01_b$ indicates repetition coding of 2 used, $10_b$ indicates repetition coding of 4 used, and $11_b$ indicates repetition coding of 6 used. For some UL-MAP IEs 1100A, if Adaptive Antenna System (AAS) or AMC UL zone is used, then the repetition coding indication 1108 may be followed by a slot offset 1110 having a length of 12 bits.

A UL-MAP Extended-2 IE 1100B may have a UIUC 1104 equal to 11 as illustrated in FIG. 11. In a UL-MAP Extended-2 IE 1100B, the UIUC 1104 may be followed by Extended-2 information elements 1112, which may include an Extended-2 UIUC having a length of 4 bits, a length field having a length of 8 bits, and a data field having a varying length according to the length field. Therefore, a UL-MAP Extended-2 IE 1100B may have a length of 32 bits plus the value in the length field.

A UL-MAP Extended IE 1100C may have a UIUC 1104 equal to 15 as illustrated in FIG. 11. In a UL-MAP Extended IE 1100C, the UIUC 1104 may be followed by Extended information elements 1114, which may include an Extended UIUC having a length of 4 bits, a length field having a length of 4 bits, and a data field having a varying length according to the length field. Therefore, a UL-MAP Extended IE 1100C may have a length of 28 bits plus the value in the length field.

A UIUC 1104 equal to 13 may indicate a UL-MAP IE 1100D for PAPR reduction and safety zones as illustrated in FIG. 11. In such a UL-MAP IE 1100D, the UIUC 1104 may be followed by a PAPR_Reduction_Safety_Sounding_Zone_Allocation_IE 1116 having a length of 32 bits. Therefore, a UL-MAP IE 1100D with a UIUC=13 may have a length of 52 bits. A UIUC 1104 equal to 0 may indicate a UL-MAP IE for the fast feedback channel, which provides a UL zone for channel quality indication (CQI). Furthermore, a UIUC 1104 equal to 12 may indicate a UL-MAP for code division multiple access (CDMA) ranging and bandwidth requests in a UL zone. Since the data following the UIUC 1104 may also have a length of 32 bits in UL-MAP IEs with a UIUC=0 or 12, such UL-MAP IEs with a UIUC=0 or 12 may have a similar format to the UL-MAP IE 1100D with a UIUC=13 and thus, may also have a length of 52 bits.

A UIUC 1104 equal to 14 may indicate a UL-MAP IE 1100E for CDMA allocation as illustrated in FIG. 11. In such a UL-MAP IE 1100E, the UIUC 1104 may be followed by a CDMA_Allocation_IE 1118 having a length of 40 bits. Therefore, a UL-MAP IE 1100E with a UIUC=14 may have a length of 60 bits.

Exemplary UL-MAP IE for Sticky Region Allocation

Figure 12:
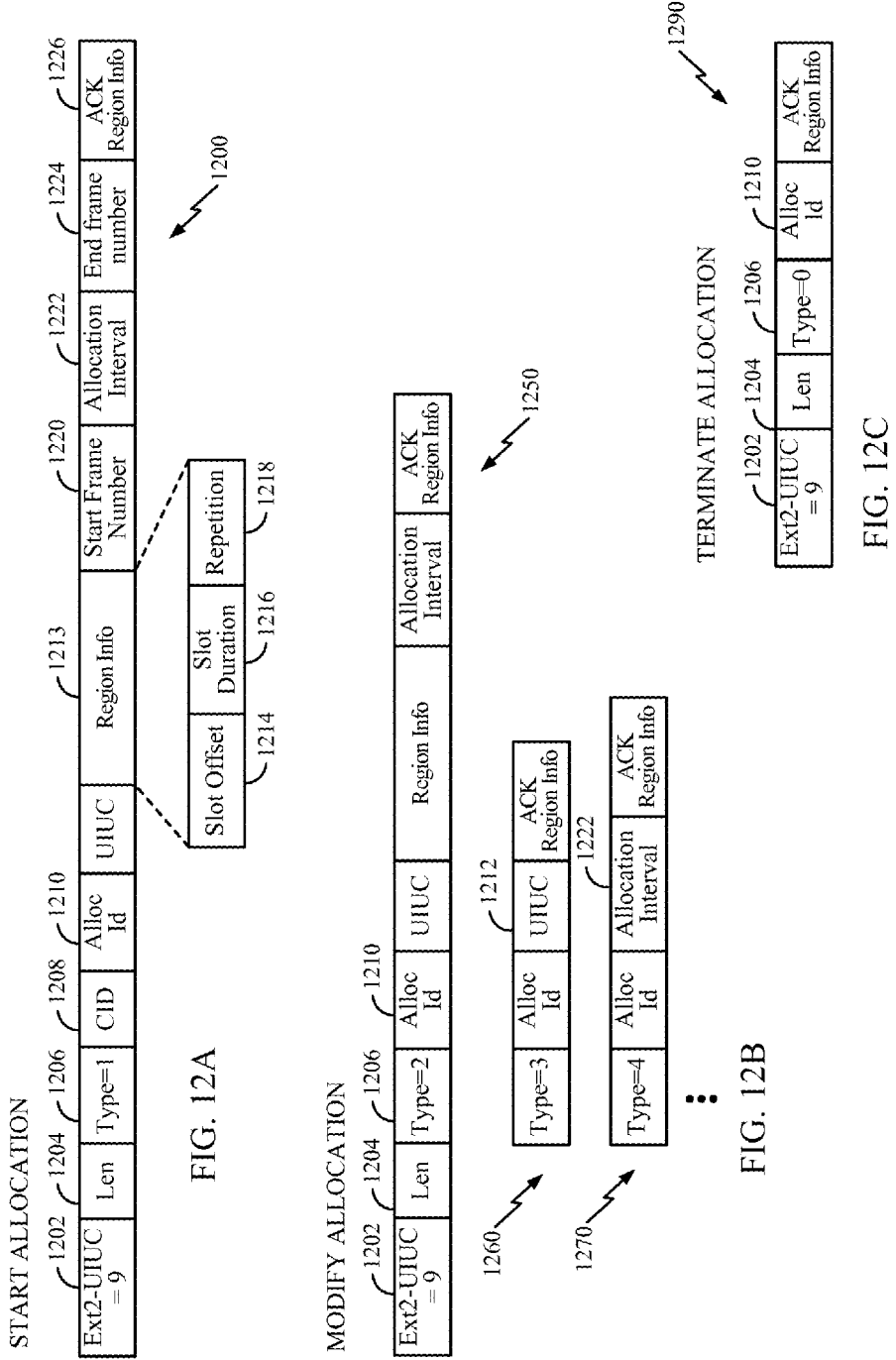
FIGS. 12A-C illustrate example UL-MAP IEs for sticky region allocation, in accordance with certain embodiments of the present disclosure.

In an effort to reduce the size of the UL-MAP 416 in subsequent frames such that more frame resources can be used for data traffic, FIGS. 12A-C illustrate example UL-MAP IEs for sticky region allocation. FIG. 12A illustrates an example Start Allocation UL-MAP IE 1200, which may be used to notify a mobile station of the allocated sticky region for encoding and placing a UL data burst to be transmitted from that particular mobile station to the base station. The Start Allocation UL-MAP IE 1200 in FIG. 12A uses a UL-MAP Extended-2 IE 1100B with a UIUC 1104 equal to 11, although any suitable UL-MAP IE structure permitting incorporation of all of the information in the Start Allocation UL-MAP IE, such as a UL-MAP Extended IE 1100C having a UIUC 1104 equal to 15, may be used. The UIUC 1104 of the Start Allocation UL-MAP IE 1200 may be followed by an Extended-2 UIUC 1202 having a value equal to 9 ($1001_b$), for example, to indicate this UL-MAP IE pertains to sticky region allocation and to convey the structure of the series of bits in the IE. Although an Extended-2 UIUC 1202 equal to 9 is illustrated in FIG. 12A, any suitable value that does not specify another type of IE may be selected, whether for Extended or Extended-2 types of UL-MAP IEs. The Extended-2 UIUC 1202 may be followed by a length field 1204 as described above.

The Start Allocation UL-MAP IE 1200 may follow the length field 1204 with a type field 1206 in an effort to specify the type of control for the sticky region allocation, which may divided into three main categories: starting the allocation, modifying the allocation, and terminating the allocation. A type field 1206 equal to 1, for example, may specify that the sticky region allocation UL-MAP IE is a Start Allocation UL-MAP IE 1200 as shown. The type field 1206 may be followed by a connection identifier (CID) 1208 to specify the owner mobile station of the sticky region, and the CID 1208 may be followed by an allocation ID 1210 to identify the sticky region. By introducing the shorter allocation ID 1210, the longer CID 1208 need not be used in subsequent UL-MAP IEs modifying or terminating the sticky region allocation, thereby further reducing the size of the UL-MAP 416 in subsequent frames having a UL-MAP IE for this sticky region.

For the Start Allocation UL-MAP IE 1200, the allocation ID 1210 may be followed by any possible components useful in setting up the sticky region and providing enough information to the mobile station such that the MS does not require any additional information to locate and encode the UL data burst in the sticky region unless something changes. The order of these components may be rearranged, and various combinations of these components may be used for sticky region allocation. For example, the allocation ID 1210 may be followed by a UIUC 1212, which may specify the modulation and coding scheme to encode and transmit the UL data burst.

As illustrated in FIG. 12A, the UIUC 1212 may be followed by region information 1213, which may include various fields for describing the sticky region. For example, the region information 1213 may include a slot offset 1214, which may be used to locate the start of the sticky region (i.e. the allocated UL data burst in an OFDMA frame) in units of slots, for example. The slot offset 1214 may be followed by a slot duration 1216, which may be used to specify the size of the sticky region in units of slots, for example. The slot duration 1216 may be followed by a repetition coding type 1218, which may indicate the repetition coding (e.g., no repetition, 2, 4, or 6) to be used to encode the UL data burst. The repetition coding type 1218 may be the last field in the region information 1213.

The region information 1213 may be followed by a starting frame number 1220, which may indicate in which OFDM/OFDMA frame the sticky region should first appear such that a UL data burst for the mobile station(s) listed in the CID 1208 is to be encoded. The starting frame number 1220 may be followed by an allocation interval 1222, which may specify the frequency of the UL sticky region writes throughout the series of received frames in the sticky region allocation period. The allocation interval 1222 may be followed by an ending frame number 1224, which may indicate the end of the sticky region allocation and may specify the last OFDM/OFDMA frame in which the sticky region will be used. For some embodiments, the ending frame number 1224 may specify the first OFDM/OFDMA frame in which the sticky region will not be used according to the allocation interval 1222 or the frame immediately following the frame containing the last use of the sticky region. Some embodiments may not include an ending frame number 1224 as a parameter in the Start Allocation UL-MAP IE 1200 since another type of UL-MAP IE may be used to end the sticky region allocation.

The ending frame number 1224 may be followed by acknowledgment (ACK) region information 1226, which may specify how the mobile station is to provide acknowledgement of the sticky region allocation to the base station. After receiving the ACK from the MS, the BS may start allocating the sticky region and transmitting accordingly. If the BS does not receive the ACK, the BS may retransmit the Start Allocation UL-MAP IE 1200.

Referring now to FIG. 12B, any parameter or combination of parameters of the sticky region allocated by the Start Allocation UL-MAP IE 1200 may be modified in any subsequent frame according to a Modify Allocation UL-MAP IE. However, some instances of sticky regions may not exercise a Modify Allocation UL-MAP IE if the sticky region allocation need not be adjusted from the start of the allocation to its termination.

One example UL-MAP IE for modifying the sticky region allocation is the Modify Allocation UL-MAP IE 1250 in which all possible parameters of the sticky region allocation may be updated. The Modify Allocation UL-MAP IE 1250 may have a type field 1206 equal to 2, for example, to indicate the parameters of the sticky region which may be modified.

For some embodiments, all of the parameters according to the type field 1206 may be included, but the values contained within one or more particular parameters may remain unchanged from the Start Allocation UL-MAP IE or the previous Modify Allocation UL-MAP IE containing one or more of those particular parameters. Therefore, the Modify Allocation UL-MAP IE 1250 may include all of the parameters from the Start Allocation UL-MAP IE 1200 with the exception of the CID 1208 (since the mobile station corresponding to the allocated sticky region should not change and is represented by the shorter allocation ID 1210) and the starting and ending frame numbers 1220, 1224 (since these frame numbers should not change for an allocated sticky region) as illustrated in FIG. 12B.

Again, the Modify Allocation UL-MAP IE 1250 may include ACK region information 1226 in an effort to specify how the mobile station is to provide acknowledgement of the modified sticky region allocation to the base station. If the BS does not receive the ACK as described above, the BS may retransmit the Modify Allocation UL-MAP IE 1250.

Although the Modify Allocation UL-MAP IE 1250 could be used to modify any parameter or combination of parameters of the sticky region, the object of embodiments of the present disclosure is to reduce the size of the control overhead, such as the UL-MAP 416. Therefore, other shorter Modify Allocation UL-MAP IEs may be used to modify certain parameters or combinations of parameters according to the type field 1206. For example, the Modify Allocation UL-MAP IE 1260 of FIG. 12B may have a type field 1206 equal to 3, for example, to indicate that only the UIUC 1212 of the sticky region is to be modified. By including only the UIUC 1104, the Extended-2 UIUC 1202, the length field 1204, the type field 1206, the allocation ID 1210, and the UIUC 1212 of the sticky region, the Modify Allocation UL-MAP IE 1260 is considerably shorter than the Start Allocation UL-MAP IE 1200 or a conventional UL-MAP IE containing all of the information for locating and encoding a UL data burst.

FIG. 12B illustrates yet another example of a Modify Allocation UL-MAP IE. An example similar to the short Modify Allocation UL-MAP IE 1260, the Modify Allocation UL-MAP IE 1270 may have a type field 1206 equal to 4, for example, to indicate that only the allocation interval 1222 of the sticky region is to be modified.

FIG. 12C illustrates a Terminate Allocation UL-MAP IE 1290 for ending the sticky region allocation. The Terminate Allocation UL-MAP IE 1290 may have a type field 1206 equal to 0, for example, to indicate that the sticky region is to be terminated and that the allocation ID 1210 may be canceled and no longer associated with the particular sticky region. Some embodiments may not employ the Terminate Allocation UL-MAP IE 1290 since the ending frame number 1224 in the Start Allocation UL-MAP IE 1200 may be used to indicate when the sticky region allocation is to be terminated. For other embodiments, the Terminate Allocation UL-MAP IE 1290 may be used to terminate the sticky region allocation earlier than originally proposed by the ending frame number 1224. For some embodiments, the mobile station may decide that the sticky region allocation has been terminated if the mobile station decodes a non-sticky-region UL-MAP IE that points to a UL data burst in or overlapping a portion of the allocated UL sticky region.

As illustrated in FIG. 12C, the Terminate Allocation UL-MAP IE 1290 may include ACK region information 1226 in an effort to specify how the mobile station is to provide acknowledgement of the terminated sticky region allocation to the base station. If the BS does not receive the ACK as described above, the BS may retransmit the Terminate Allocation UL-MAP IE 1290.

Once a UL sticky region is allocated, the corresponding UL-MAP IE may be omitted from UL-MAPs 416 transmitted in subsequent OFDMA frames by the base station, unless the sticky region allocation is to be modified or terminated. When this UL-MAP IE is removed, any UL burst region following the UL sticky region can not be correctly specified because each UL-MAP IE does not include an absolute location (i.e., a starting symbol and a starting subchannel) for the start of the UL data bursts. Instead according to the present IEEE 802.16x standard, the mobile station typically checks the duration of all UL-MAP IEs in front of its UL data burst region to obtain the starting point, so a missing UL-MAP IE for the sticky region may most likely lead to incorrect symbol/subchannel positioning of the subsequent UL data bursts in the UL subframe 404.

In order to correct for the missing sticky region UL-MAP IE, a UL_Allocation_Start_IE may be used to specify the absolute location for the start of the UL data bursts for some embodiments. Since the UL_Allocation_Start_IE is much shorter than a normal UL data burst IE, UL-MAP size reduction is still achieved. This method does not break compatibility for the mobile stations without sticky region allocation capability.

Figure 10B:
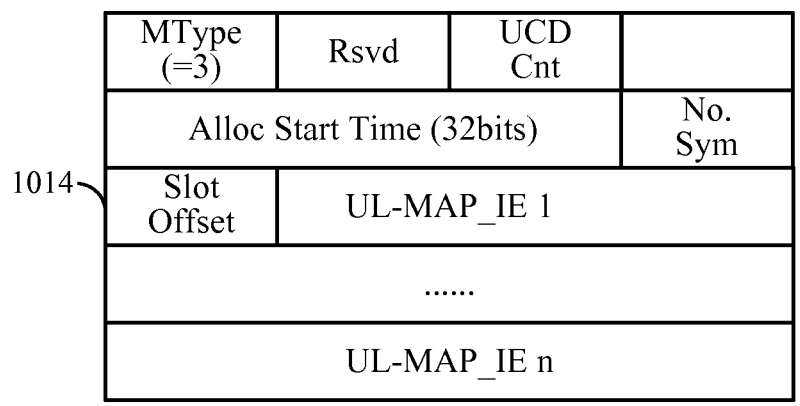
FIG. 10B illustrates the format of a UL-MAP message with an added slot offset, in accordance with certain embodiments of the present disclosure.

For further UL-MAP size reduction in some embodiments, a starting slot offset 1014 may be introduced into a proposed UL-MAP 416' as illustrated in FIG. 10B, after the number of symbols field 1010 and before the first UL-MAP IE 1012₁. This scheme assumes that the allocated sticky region(s) will be positioned before the non-sticky-region UL data bursts in the UL subframe 404. Being only a few bits in length (e.g., 8 bits), the starting slot offset 1014 is still considerably shorter than a conventional UL-MAP IE, so the OFDMA control overhead may still be reduced with sticky region allocation. With the starting slot offset 1014 in the new UL-MAP 416', a mobile station transmitting a non-sticky-region UL data burst may use the starting slot offset 1014 and the duration of all UL-MAP IEs in front of its UL data burst region to correctly obtain its designated starting slot. In this manner, the starting slot offset 1014 may protect the sticky-region UL data bursts from being overwritten by the mobile stations that do not have information about the sticky regions. Thus, implementation of the UL sticky region allocation as described herein may point to base stations that send the proposed UL-MAP 416' and to mobile stations supporting UL sticky region allocation and capable of interpreting the starting slot offset 1014.

Exemplary Method for Interpreting a UL-MAP IE for Sticky Region Allocation

Figure 13:
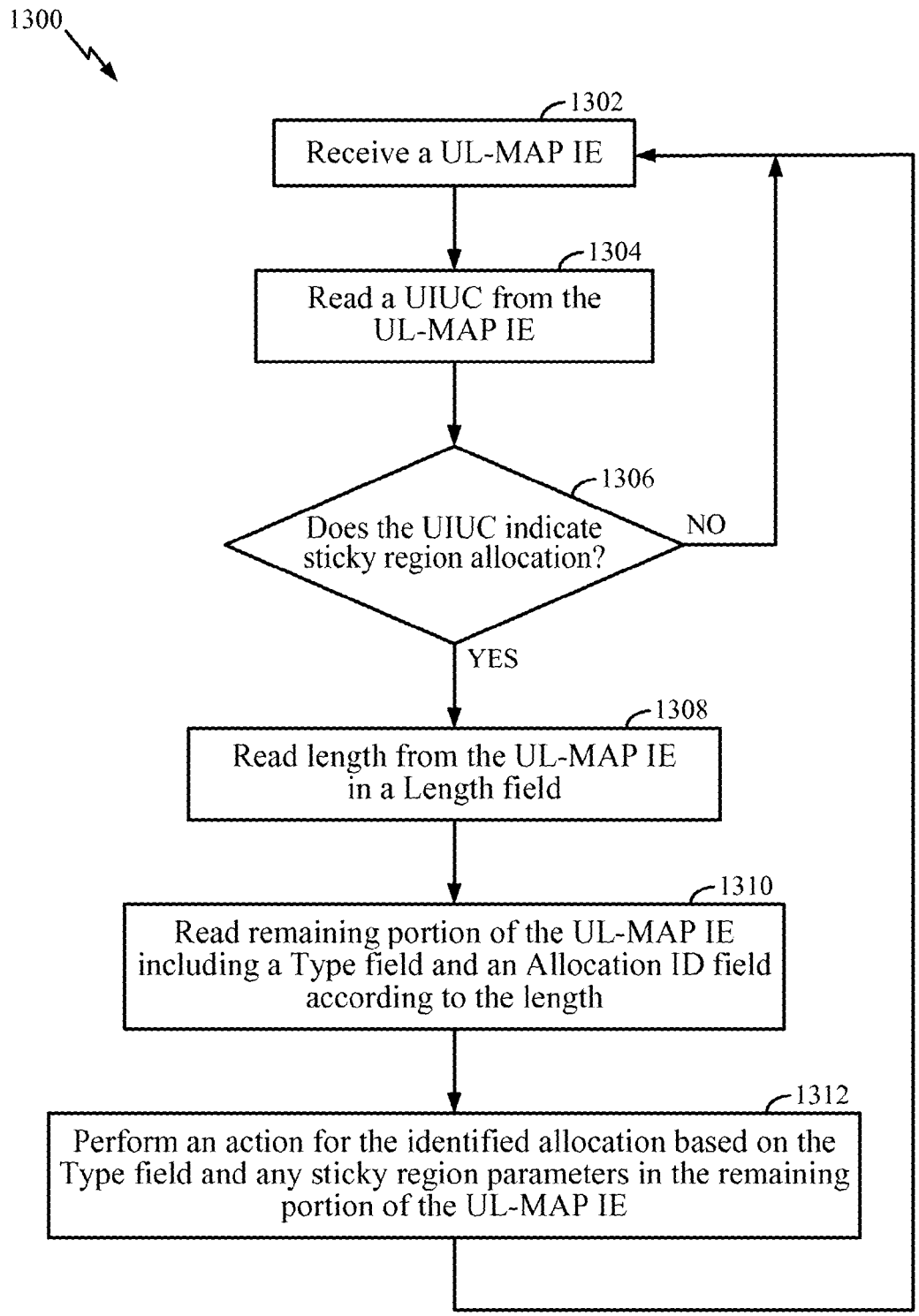
FIG. 13 is a flow chart of example operations for interpreting the UL-MAP IEs of FIGS. 12A-C, in accordance with certain embodiments of the present disclosure.

FIG. 13 is a flow chart of example operations 1300 for interpreting UL-MAP IEs for sticky region allocation, such as the UL-MAP IEs of FIGS. 12A-C. The operations 1300 begin, at 1302, by receiving a UL-MAP IE 1012 in a UL-MAP 416 of an OFDM/OFDMA frame 400. At 1304, the UIUC 1104 and possibly the Extended-2 UIUC 1202 (or the Extended UIUC for some embodiments) may be read.

If the UIUC values do not indicate sticky region allocation at 1306, then the UL-MAP IE may be interpreted conventionally based on the UIUC 1104, which is outside the scope of the operations 1300, and the operations 1300 may be repeated beginning at 1302 with a new UL-MAP IE from the same frame or a different frame. It is worth mentioning here that all mobile stations may not support sticky region allocation, especially products from competitors. In such cases, a base station that supports sticky region allocation may be backwards compatible and may transmit one UL-MAP IE in each OFDM/OFDMA frame for each of the mobile stations that does not support sticky region allocation, as has been done conventionally. The base station may continue to use sticky region allocation for the mobile stations that support this overhead-reducing technique.

However, if the UIUC values indicate sticky region allocation (e.g., the UIUC 1104 is equal to 11 and the Extended-2 DIUC 662 is equal to 9) at 1306, then a length value may be read from a Length field (e.g., length field 1204) at 1308. At 1310, a remaining portion of the sticky region UL-MAP IE may be read according to the length value. The remaining portion of the sticky region UL-MAP IE may include a type field 1206 and an allocation ID 1210 as described above. At 1312, an action for the sticky region allocation identified by the allocation ID 1210 may be performed based on the type field 1206 and any sticky region parameters in the remaining portion of the sticky region UL-MAP IE (e.g., starting a sticky region allocation or modifying certain parameters of the allocated sticky region). The operations 1300 may be repeated beginning at 1302 with a new UL-MAP IE from the same or a different frame.

Exemplary Method of Operating with UL-MAP IEs for Sticky Region Allocation

Figure 14:
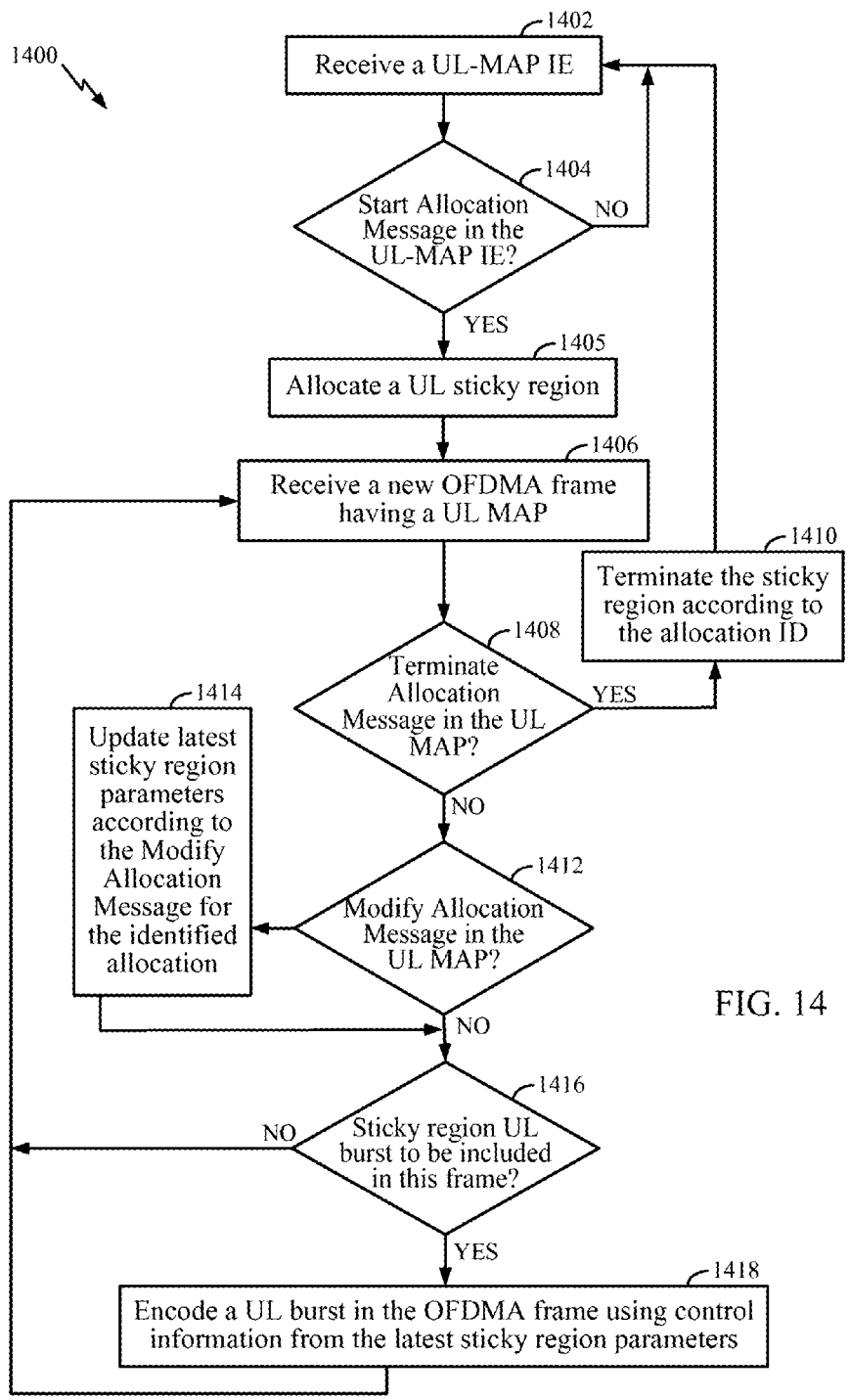
FIG. 14 is a flow chart of example operations for receiving multiple OFDMA frames with a UL-MAP and writing UL bursts for transmission with the use of UL-MAP IEs for sticky region allocation from the perspective of a mobile station (MS), in accordance with certain embodiments of the present disclosure.

Now that a method of interpreting a UL-MAP IE for sticky region allocation has been described, FIG. 14 is a flow chart of example operations 1400 for receiving multiple OFDMA frames and encoding UL data bursts with the use of UL-MAP IEs for sticky region allocation from the perspective of a mobile station (MS) (assuming that a base station is transmitting the signal for reception). The operations 1400 of FIG. 14 assume that a sticky region has not yet been allocated before the operations begin and are not concerned with reading conventional UL-MAP IEs for locating and encoding UL data bursts. As used herein, "locating a UL data burst" generally refers to determining a time/frequency location in the UL subframe 404 for placing a UL data burst. Furthermore, the operations 1400 are only concerned with a single sticky region for clarity, although multiple sticky regions may be allocated with different starting and ending frame numbers.

The operations 1400 begin, at 1402, by receiving a UL-MAP IE 1012 in a UL-MAP 416 of an OFDMA frame. If the UL-MAP IE 1012 does not include a Start Allocation Message at 1404, then the operations 1400 may be repeated beginning at 1402 with a new UL-MAP IE from the same frame or a different frame. However, if the UL-MAP IE 1012 does include a Start Allocation Message (e.g. the Start Allocation UL-MAP IE 1200) at 1404, then a UL sticky region may be allocated at 1405 according to the Start Allocation Message.

At 1406, a new OFDMA frame with a new UL-MAP 416 may be received. If the new UL-MAP includes a Terminate Allocation Message (e.g., the Terminate Allocation UL-MAP IE 1290) in any of the UL-MAP IEs at 1408, then the sticky region allocated at 1405 may be terminated at 1410 according to the allocation ID 1210, for example, and the operations 1400 may be repeated beginning at 1402 with a new UL-MAP IE from the same frame or a different frame.

However, if the UL-MAP does not include a Terminate Allocation Message at 1408 for the allocated sticky region, then the mobile station may determine if the UL-MAP includes a Modify Allocation Message in any of the UL-MAP IEs at 1412. If the UL-MAP includes a Modify Allocation Message (e.g., the Modify Allocation UL-MAP IEs 1250, 1260, 1270), then the parameters of the sticky region identified by the allocation ID 1210, for example, may be updated according to the Modify Allocation Message.

Regardless whether the UL-MAP included a Modify Allocation Message at 1412, the mobile station may determine at 1416 whether a sticky region UL data burst is to be included (i.e., written) in the current OFDMA frame. This may be determined based on the latest allocation interval 1222 and, for some embodiments, may depend on the starting frame number 1220 even when the allocation interval 1222 is modified. If a UL data burst for the allocated sticky region is not to be included in this frame, then the operations 1400 may repeat beginning at 1406 with another new OFDMA frame. If a sticky region UL data burst is to be included in the current frame, then the UL data burst may be encoded at 1418 using control information from the latest sticky region parameters, some of which may have been initialized at the start of the allocation and others which may have modified during wireless communication between the base station and the mobile station. The UL data burst may be subsequently transmitted from the mobile station to the base station. After the sticky region UL data burst is encoded at 1418, then the operations 1400 may repeat beginning at 1406 with another new OFDMA frame.

Once a sticky region has been allocated in the operations 1400, the mobile station may continually encode a sticky region UL data burst at the allocated symbol/subchannel position in the UL subframe 404 without ever receiving another UL-MAP IE corresponding to that particular sticky region UL data burst. Even if the sticky region allocation is to be modified or terminated, the UL-MAP IEs instructing the mobile station to perform these actions may be considerably shorter than a conventional UL-MAP IE. In this manner, the UL-MAP IE for this UL data burst need not be repeated in every single OFDMA frame that contains this UL data burst. Therefore, the size of the UL-MAP 416 transmitted by the base station may be reduced, freeing up frame resources that can be used for data traffic in an effort to increase wireless communication efficiency and performance.

Exemplary Overview of Sticky Region Allocation

Figure 15:
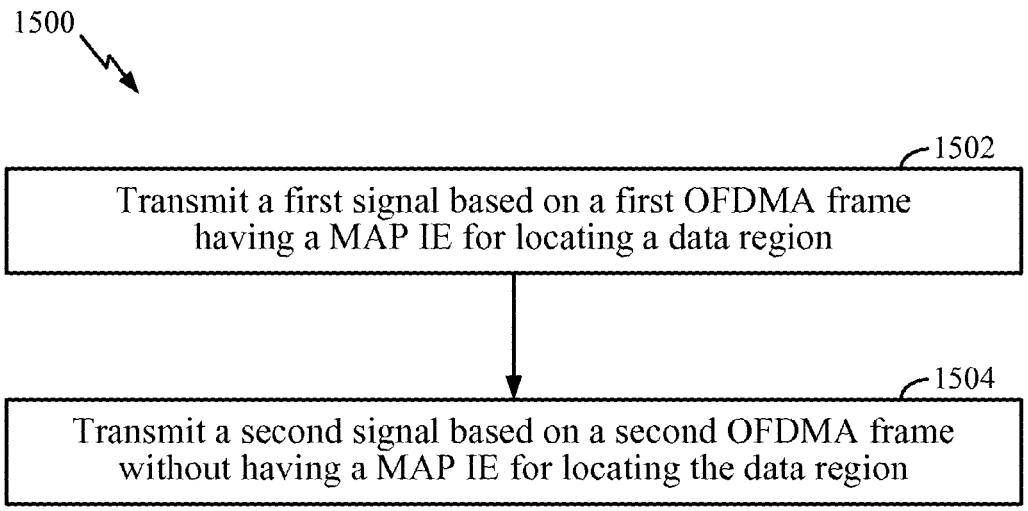
FIG. 15 is a flow chart of example operations for transmitting OFDMA frames with and without MAP IEs for locating corresponding data bursts, in accordance with certain embodiments of the present disclosure.

FIG. 15 illustrates a flow diagram of example operations 1500 for transmitting OFDMA frames with and without MAP IEs for locating corresponding data bursts according to sticky region allocation. The operations may begin, at 1502, by transmitting a first signal based on a first OFDMA frame having a MAP IE for locating a data region, such as a Start Allocation DL-MAP IE 700 or UL-MAP IE 1200 for a DL or a UL data burst, respectively, in a starting OFDMA frame, which may be the first frame or a subsequent OFDMA frame according to the starting frame number 724, 1220, for example. At 1504, a second signal based on a second OFDMA frame may be transmitted, wherein the second signal does not have a MAP IE for locating the data burst within the second OFDMA frame. A base station, for example, may transmit the first and the second signals.

Conventionally, each data burst in an OFDMA frame has a corresponding MAP IE. The advantage of being able to transmit signals based on an OFDMA frame without one or more MAP IEs for locating corresponding data bursts is that the size of the DL-MAP and/or UL-MAP decreases. When the control overhead is reduced, the data throughput can be increased.

Figure 15A:
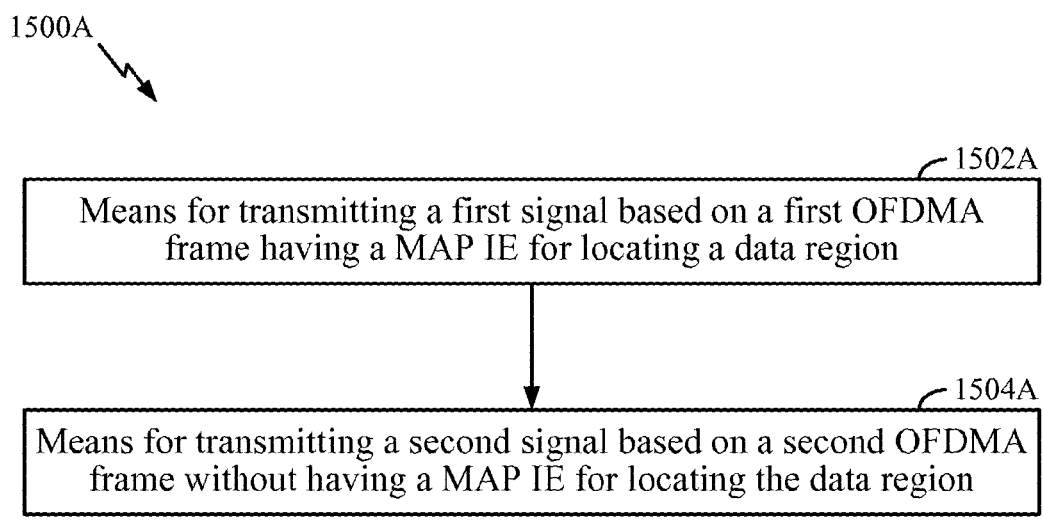
FIG. 15A is a block diagram of means corresponding to the example operations for transmitting OFDMA frames of FIG. 15, in accordance with certain embodiments of the present disclosure.

The operations 1500 of FIG. 15 described above may be performed by various hardware and/or software component(s) and/or module(s) corresponding to the means-plus-function blocks 1500A illustrated in FIG. 15A. In other words, blocks 1502 through 1504 illustrated in FIG. 15 correspond to means-plus-function blocks 1502A through 1504A illustrated in FIG. 15A.

Figure 16:
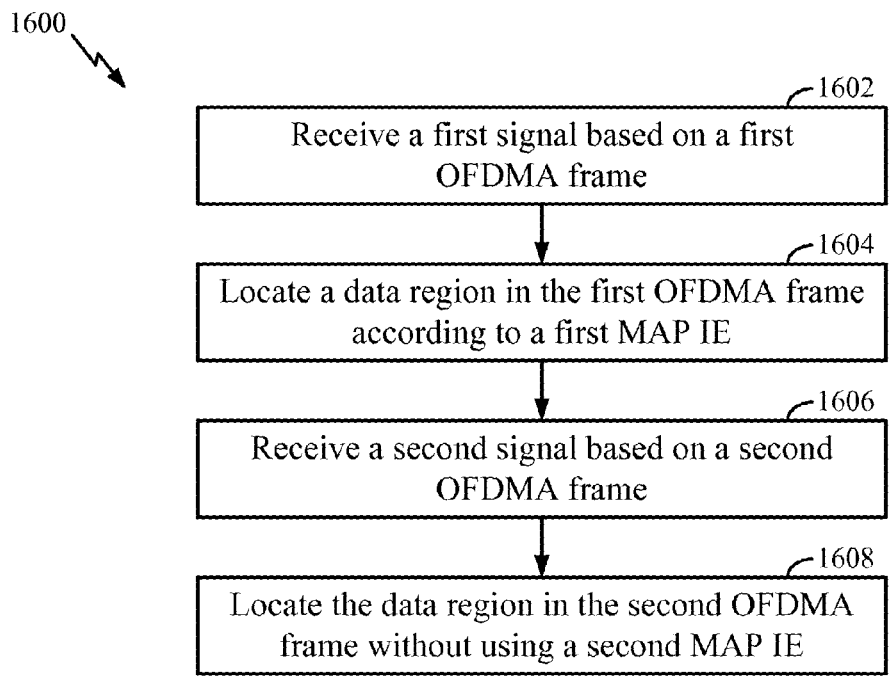
FIG. 16 is a flow chart of example operations for receiving OFDMA frames and locating corresponding data bursts with and without MAP IEs, in accordance with certain embodiments of the present disclosure.

FIG. 16 illustrates a flow diagram of example operations 1600 for receiving OFDMA frames and locating corresponding data bursts with and without MAP IEs. Again, "locating"

may be considered to mean finding a location of a DL data burst within the DL subframe 402 when used with DL data bursts and, when used with UL bursts, may be considered to mean determining a location in the UL subframe 404 for placing a UL data burst.

The operations may begin, at 1602, by receiving a first signal based on a first OFDMA frame. The receiver may be a user terminal, such as a mobile station. At 1604, a data region, such as a DL or UL data burst, may be located in the first OFDMA frame according to a first MAP IE, such as a Start Allocation DL-MAP IE 700 or UL-MAP IE 1200 for the DL or UL data burst, respectively. The first MAP IE may have been decoded from the first OFDMA frame or from a previously received OFDMA frame.

A second signal based on a second OFDMA frame may be received at 1606. At 1608, the data region may be located in the second OFDMA frame without using a second MAP IE. In other words, the data region may be located based on the first MAP IE, which may have been a sticky region MAP IE. Conventionally, user terminals needed the second MAP IE to locate the data region in the second OFDMA frame.

Figure 16A:
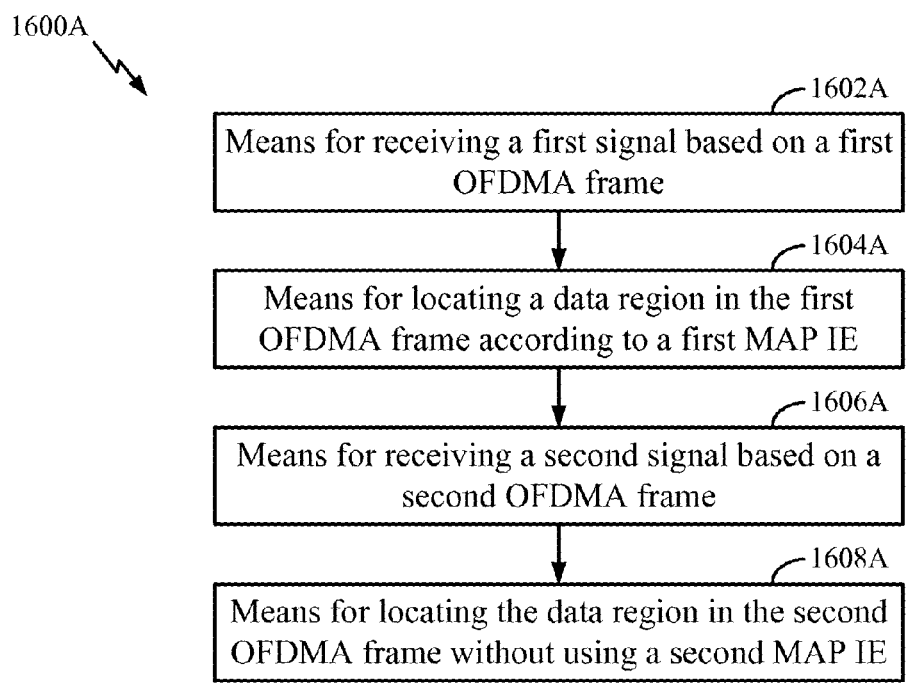
FIG. 16A is a block diagram of means corresponding to the example operations for receiving OFDMA frames and locating corresponding data bursts of FIG. 16, in accordance with certain embodiments of the present disclosure.

The operations 1600 of FIG. 16 described above may be performed by various hardware and/or software component(s) and/or module(s) corresponding to the means-plus-function blocks 1600A illustrated in FIG. 16A. In other words, blocks 1602 through 1608 illustrated in FIG. 16 correspond to means-plus-function blocks 1602A through 1608A illustrated in FIG. 16A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method comprising:
receiving a first signal based on a first orthogonal frequency division multiple access (OFDMA) frame having a first MAP information element (IE) comprising a frame number of a starting OFDMA frame;

locating a data region related to a data burst in the starting OFDMA frame according to the first MAP IE;

receiving a second signal based on a second OFDMA frame, wherein the second signal is received later than a signal based on the starting OFDMA frame;

locating the data region related to a different data burst in the second OFDMA frame without using a second MAP IE; and decoding the second OFDMA frame without using a MAP IE different from the first MAP IE.

2. The method of claim 1, wherein the data region is a downlink (DL) data region and the first MAP IE is a DL-MAP IE.

3. The method of claim 1, wherein the data region is an uplink (UL) data region and the first MAP IE is a UL-MAP IE.

4. The method of claim 3, wherein an uplink map (UL-MAP) for the second OFDMA frame has a starting slot offset appearing before all MAP IEs in the UL-MAP such that the data region may be located correctly.

5. The method of claim 1, wherein the first MAP IE contains a message having region information for determining a fixed position for the data region within the starting and the second OFDMA frames.

6. The method of claim 5, wherein the region information comprises at least one of a symbol offset, a subchannel offset, a number of symbols, a number of subchannels, a boosting level, a permutation type, and a repetition coding type.

7. The method of claim 5, wherein the region information comprises at least one of a slot offset, a slot duration, and a repetition coding type.

8. The method of claim 5, wherein the message comprises the starting frame number and an allocation interval related to the data region.

9. The method of claim 5, wherein the message comprises at least one of an allocation identifier, an ending frame number, a Downlink Interval Usage Code (DIUC) or an Uplink Interval Usage Code (UIUC), and acknowledgment (ACK) region information.

10. The method of claim 1, wherein the first MAP IE is from the starting OFDMA frame.

11. The method of claim 1, further comprising locating the data region in one or more subsequent signals based on subsequent OFDMA frames until a MAP IE that specifies termination of allocation of the data region is received.

12. A method comprising:
receiving a first signal based on a first orthogonal frequency division multiple access (OFDMA) frame having a first MAP information element (IE) comprising a frame number of a starting OFDMA frame;

locating a data region related to a data burst in the starting OFDMA frame according to the first MPA IE;

receiving a second signal based on a second OFDMA frame, wherein the second signal is received later than a signal based on the starting OFDMA frame; and locating the data region related to a different data burst in the second OFDMA frame without using a second MAP IE, wherein the first MAP IE contains a message having region information for determining a fixed position for the data region within the starting and the second OFDMA frames, wherein locating the data region in the starting OFDMA frame comprises using the starting frame number and the region information and locating the data region in the second OFDMA frame comprises using the allocation interval and the region information in the message of the first MAP IE such that the second frame is received a number of OFDMA frames after the starting frame according to the allocation interval.

13. A receiver for wireless communication, comprising:
a processor and memory containing logic configured to locate a data region comprising a data burst in a starting orthogonal frequency division multiple access (OFDMA) frame of a first signal received by the receiver according to a first MAP information element (IE), wherein the first MAP IE comprises a frame number of the starting OFDMA frame; and a processor and memory containing logic configured to locate and decode, without using a second MAP IE, the data region comprising a different data burst in a second OFDMA frame of a second signal received by the receiver, wherein the second signal is received later than the first signal.

14. The receiver of claim 13, wherein the data region is a downlink (DL) data region and the first MAP IE is a DL-MAP IE.

15. The receiver of claim 13, wherein the data region is an uplink (UL) data region and the first MAP IE is a UL-MAP IE.

16. The receiver of claim 13, wherein the first MAP IE contains a message comprising:
region information for determining a fixed position for the data region within the starting and the second OFDMA frames;
the starting frame number; and
an allocation interval.

17. The receiver of claim 13, wherein the first MAP IE is from the starting OFDMA frame.

18. A receiver for wireless communication, comprising:
a processor and memory containing logic configured to locate a data region comprising a data burst in a starting orthogonal frequency division multiple access (OFDMA) frame of a first signal received by the receiver according to a first MAP information element (IE), wherein the first MAP IE, the data region comprising a different data burst in a second OFDMA frame of a second signal received by the receiver, wherein the second signal is received later than the first signal, wherein the first MAP IE contains a message comprising:
region information for determining a fixed position for the data region within the starting and the second OFDMA frames;
the starting frame number; and
an allocation interval,
wherein the logic is configured to locate the data region in the starting OFDMA frame by using the starting frame number and the region information and configured to locate the data region in the second OFDMA frame by using the allocation interval and the region information in the message of the first MAP IE, wherein the second frame is received a number of OFDMA frames after the starting frame according to the allocation interval.

19. An apparatus for wireless communication, comprising:
means for receiving a first signal based on a first orthogonal frequency division multiple access (OFDMA) frame having a first MAP information element (IE) comprising a frame number of a starting OFDMA frame;

means for locating a data region comprising a data burst in the starting OFDMA frame according to the first MAP information element (IE), wherein the locating a data region comprising a data burst is performed by a processor and memory and the processor and memory extract frame location information from a start allocation downlink map;

means for receiving a second signal based on a second OFDMA frame, wherein the second signal is received later than a signal based on the starting OFDMA frame; and means for locating the data region comprising a different data burst in the second OFDMA frame without using a second MAP IE, wherein the locating the data region comprising a different data burst is performed by a processor and memory and the processor and memory extract frame information from a downlink map, and wherein the second OFDMA frame is decoded without using a second MAP IE.

20. The apparatus of claim 19, wherein the data region is a downlink (DL) data region and the first MAP IE is a DL-MAP IE.

21. The apparatus of claim 19, wherein the data region is an uplink (UL) data region and the first MAP IE is a UL-MAP IE.

22. The apparatus of claim 19, wherein the first MAP IE contains a message comprising:
region information for determining a fixed position for the data region within the starting and the second OFDMA frames;
the starting frame number; and
an allocation interval.

23. An apparatus for wireless communication, comprising:
means for receiving a first signal based on a first orthogonal frequency division multiple access (OFDMA) frame having a first MAP information element (IE) comprising a frame number of a starting OFDMA frame;
means for locating a data region comprising a data burst in the starting OFDMA frame according to the first MAP information element (IE), wherein the locating a data region comprising a data burst is performed by a processor and memory;
means for receiving a second signal based on a second OFDMA frame, wherein the second signal is received later than a signal based on the starting OFDMA frame;
means for locating the data region comprising a different data burst in the second OFDMA frame without using a second MAP IE, wherein the locating the data region comprising a different data burst is performed by a processor and memory; and wherein the first MAP IE contains a message comprising:
region information for determining a fixed position for the data region within the starting and the second OFDMA frames;
the starting frame number; and
an allocation interval, wherein the means for locating the data region in the starting OFDMA frame is configured to use the starting frame number and the region information and the means for locating the data region in the second OFDMA frame is configured to use the allocation interval and the region information in the message of the first MAP IE, wherein the second frame is received a number of OFDMA frames after the starting frame according to the allocation interval.

24. A mobile device, comprising:
a receiver front end for receiving a first signal based on a first orthogonal frequency division multiple access (OFDMA) frame having a first MAP information element (IE) comprising a frame number of a starting OFDMA frame and a second signal based on a second OFDMA frame, wherein the second signal is received later than a signal based on the starting OFDMA frame; and a processor and memory containing logic configured to locate a data region related to a data burst in the starting OFDMA frame according to the first MAP information element (IE); and
a processor and memory containing logic configured to locate and decode the data region related to a different data burst in the second OFDMA frame without using a second MAP IE.

25. The mobile device of claim 24, wherein the data region is a downlink (DL) data region and the first MAP IE is a DL-MAP IE.

26. The mobile device of claim 24, wherein the data region is an uplink (UL) data region and the first MAP IE is a UL-MAP IE.

27. A non-transitory computer-readable medium comprising a program for locating a data region in multiple orthogonal frequency division multiple access (OFDMA) frames, which, when executed by a processor, performs operations comprising:
receiving a first signal based on a first OFDMA frame having a first MAP information element (IE) comprising a frame number of a starting OFDMA frame;
locating a data region corresponding to a data burst in the starting OFDMA frame according to the first MAP information element (IE);
receiving a second signal based on a second OFDMA frame, wherein the second signal is received later than a signal based on the starting OFDMA frame; and
locating the data region corresponding to a different data burst in the second OFDMA frame without using a second MAP IE,
decoding the data region corresponding to the different data burst in the second OFDMA frame without using a MAP IE that is different from the first MAP IE.

28. The non-transitory computer-readable medium of claim 27, wherein the data region is a downlink (DL) data region and the first MAP IE is a DL-MAP IE.

29. The non-transitory computer-readable medium of claim 27, wherein the data region is an uplink (UL) data region and the first MAP IE is a UL-MAP IE.

30. The non-transitory computer-readable medium of claim 27, wherein the first MAP IE contains a message comprising:
region information for determining a fixed position for the data region within the starting and the second OFDMA frames;
the starting frame number; and
an allocation interval.

31. A non-transitory computer-readable medium comprising a program for locating a data region in multiple orthogonal frequency division multiple access (OFDMA) frames, which, when executed by a processor, performs operations comprising:
receiving a first signal based on a first OFDMA frame having a first MAP information element (IE) comprising a frame number of a starting OFDMA frame;
locating a data region corresponding to a data burst in the starting OFDMA frame according to the first MAP information element (IE);
receiving a second signal based on a second OFDMA frame, wherein the second signal is received later than a signal based on the starting OFDMA frame; and
locating the data region corresponding to a different data burst in the second OFDMA frame without using a second MAP IE wherein the first MAP IE contains a message comprising:

region information for determining a fixed position for the data region within the starting and the second OFDMA frames;

the starting frame number; and an allocation interval, wherein locating the data region in the starting OFDMA frame comprises using the starting frame number and the region information and locating the data region in the second OFDMA frame comprises using the allocation interval and the region information in the message of the first MAP IE such that the second frame is received a number of OFDMA frames after the starting frame according to the allocation interval.

32. A method comprising:

transmitting a first signal comprising a data burst in a data region based on a first orthogonal frequency division multiple access (OFDMA) frame having a MAP information element (IE) for locating the data region in a starting OFDMA frame, wherein the MAP IE comprises a starting frame number of the starting OFDMA frame; and transmitting a second signal comprising a different data burst based on a second OFDMA frame without a MAP IE for locating the data region in the second OFDMA frame, wherein the second signal is transmitted later than a signal based on the starting OFDMA frame.

33. The method of claim 32, wherein the data region is a downlink (DL) data region and the MAP IE for locating the data region in the starting OFDMA frame is a DL-MAP IE.

34. The method of claim 32, wherein the data region is an uplink (UL) data region and the MAP IE for locating the data region in the starting OFDMA frame is a UL-MAP IE.

35. The method of claim 34, wherein an uplink map (UL-MAP) for the second OFDMA frame has a starting slot offset appearing before all MAP IEs in the UL-MAP such that the data region may be located correctly.

36. The method of claim 32, wherein the MAP IE contains a message having region information for establishing a fixed position for the data region within the starting and the second OFDMA frames.

37. The method of claim 36, wherein the region information comprises at least one of a symbol offset, a subchannel offset, a number of symbols, a number of subchannels, a boosting level, a permutation type, and a repetition coding type.

38. The method of claim 36, wherein the region information comprises at least one of a slot offset, a slot duration, and a repetition coding type.

39. The method of claim 36, wherein the message comprises the starting frame number and an allocation interval.

40. The method of claim 36, wherein the message comprises at least one of an allocation identifier, an ending frame number, a Downlink Interval Usage Code (DIUC) or an Uplink Interval Usage Code (UIUC), and acknowledgment (ACK) region information.

41. The method of claim 32, wherein the starting OFDMA frame is the first OFDMA frame and the first signal is the signal based on the starting OFDMA frame.

42. The method of claim 32, wherein the signal based on the starting OFDMA frame is transmitted later than the first signal.

43. The method of claim 32, further comprising transmitting a third signal comprising a MAP IE specifying termination of allocation of the data region.

44. A method comprising:

transmitting a first signal comprising a data burst in a data region based on a first orthogonal frequency division multiple access (OFDMA) frame having a MAP information element (IE) for locating the data region in a starting OFDMA frame, wherein the MAP IE comprises a starting frame number of the starting OFDMA frame; and transmitting a second signal comprising a different data burst based on a second OFDMA frame without a MAP IE for locating the data region in the second OFDMA frame, wherein the second signal is transmitted later than a signal based on the starting OFDMA frame, and wherein the MAP IE contains a message having region information for establishing a fixed position for the data region within the starting and the second OFDMA frames, wherein the signal based on the starting OFDMA frame is transmitted according to the starting frame number and the second signal based on the second OFDMA frame is transmitted a number of OFDMA frames after the signal based on the starting OFDMA frame according to the allocation interval in the message of the MAP IE.

45. A transmitter for wireless communication, comprising:

a processor and memory containing logic for transmitting, from a base station, a first signal comprising a data burst based on a first orthogonal frequency division multiple access (OFDMA) frame having a MAP information element (IE) for locating a data region comprising the data burst in a starting OFDMA frame, wherein the MAP IE comprises a starting frame number of the starting OFDMA frame; and a processor and memory containing logic for transmitting, from the base station, a second signal comprising a different data burst based on a second OFDMA frame without a MAP IE for locating the data region comprising the different data burst in the second OFDMA frame, wherein the second signal is transmitted later than a signal based on the starting OFDMA frame.

46. The transmitter of claim 45, wherein the data region is a downlink (DL) data region and the MAP IE for locating the data region in the starting OFDMA frame is a DL-MAP IE.

47. The transmitter of claim 45, wherein the data region is an uplink (UL) data region and the MAP IE for locating the data region in the starting OFDMA frame is a UL-MAP IE.

48. The transmitter of claim 45, wherein the MAP IE contains a message comprising:

region information for establishing a fixed position for the data region within the starting and the second OFDMA frames;

the starting frame number; and an allocation interval.

49. The transmitter of claim 45, wherein the starting OFDMA frame is the first OFDMA frame and the first signal is the signal based on the starting OFDMA frame.

50. The transmitter of claim 45, wherein the logic is configured to transmit the signal based on the starting OFDMA frame later than the first signal.

51. A transmitter for wireless communication, comprising:

a processor and memory containing logic for transmitting, from a base station, a first signal comprising a data burst based on a first orthogonal frequency division multiple access (OFDMA) frame having a MAP information element (IE) for locating a data region comprising the data burst in a starting OFDMA frame, wherein the MAP IE comprises a starting frame number of the starting OFDMA frame;

a processor and memory containing logic for transmitting, from the base station, a second signal comprising a different data burst based on a second OFDMA frame without a MAP IE for locating the data region comprising the different data burst in the second OFDMA frame, wherein the second signal is transmitted later than a signal based on the starting OFDMA frame, wherein the MAP IE contains a message comprising:
region information for establishing a fixed position for the data region within the starting and the second OFDMA frames;
the starting frame number; and
an allocation interval, wherein the logic is configured to transmit the signal based on the starting OFDMA frame according to the starting frame number and configured to transmit the second signal based on the second OFDMA frame a number of OFDMA frames after the signal based on the starting OFDMA frame according to the allocation interval in the message of the MAP IE.

52. An apparatus for wireless communication, comprising:
means for transmitting, from a base station, a first signal based on a first orthogonal frequency division multiple access (OFDMA) frame having a MAP information element (IE) for locating a data region in a starting OFDMA frame and comprising a data burst in the data region, wherein the MAP IE comprises a starting frame number of the starting OFDMA frame, wherein the first signal is prepared for transmission by a processor and memory; and
means for transmitting, from the base station, a second signal based on a second OFDMA frame without a MAP IE for locating the data region in the second OFDMA frame and comprising a different data burst in the data region, wherein the second signal is transmitted later than a signal based on the starting OFDMA frame, wherein the second signal is prepared for transmission by a processor and memory.

53. The apparatus of claim 52, wherein the data region is a downlink (DL) data region and the MAP IE for locating the data region in the starting OFDMA frame is a DL-MAP IE.

54. The apparatus of claim 52, wherein the data region is an uplink (UL) data region and the MAP IE for locating the data region in the starting OFDMA frame is a UL-MAP IE.

55. The apparatus of claim 52, wherein the MAP IE contains a message comprising:
region information for establishing a fixed position for the data region within the starting and the second OFDMA frames;
the starting frame number; and
an allocation interval.

56. An apparatus for wireless communication, comprising:
means for transmitting, from a base station, a first signal based on a first orthogonal frequency division multiple access (OFDMA) frame having a MAP information element (IE) for locating a data region in a starting OFDMA frame and comprising a data burst in the data region, wherein the MAP IE comprises a starting frame number of the starting OFDMA frame, wherein the first signal is prepared for transmission by a processor and memory; and
means for transmitting, from the base station, a second signal based on a second OFDMA frame without a MAP IE for locating the data region in the second OFDMA frame and comprising a different data burst in the data region, wherein the second signal is transmitted later than a signal based on the starting OFDMA frame, wherein the second signal is prepared for transmission by a processor and memory, wherein the MAP IE contains a message comprising:
region information for establishing a fixed position for the data region within the starting and the second OFDMA frames;
the starting frame number; and
an allocation interval and further comprising a means for transmitting the signal based on the starting OFDMA frame, wherein the means for transmitting the signal based on the starting OFDMA frame is configured to transmit the signal based on the starting OFDMA frame a number of OFDMA frames after the first signal according to the starting frame number in the message of the MAP IE.

57. The apparatus of claim 55, wherein the means for transmitting the second signal is configured to transmit the second signal based on the second OFDMA frame a number of OFDMA frames after the signal based on the starting OFDMA frame according to the allocation interval in the message of the MAP IE.

58. A base station, comprising:
a processor and memory containing logic configured to generate a first orthogonal frequency division multiple access (OFDMA) frame having a MAP information element (IE) for locating a data region comprising a data burst in a starting OFDMA frame, wherein the MAP IE comprises a starting frame number of the starting OFDMA frame, and configured to create a second OFDMA frame without a MAP IE for locating the data region comprising a different data burst in the second OFDMA frame; and
a transmitter front end for transmitting a first signal based on the first OFDMA frame, a second signal based on the second OFDMA frame, and a signal based on the starting OFDMA frame, wherein the second signal is transmitted later than the signal based on the starting OFDMA frame.

59. The base station of claim 58, wherein the data region is a downlink (DL) data region and the MAP IE for locating the data region in the starting OFDMA frame is a DL-MAP IE.

60. The base station of claim 58, wherein the data region is an uplink (UL) data region and the MAP IE for locating the data region in the starting OFDMA frame is a UL-MAP IE.

61. A non-transitory computer-readable medium comprising a program for transmitting multiple orthogonal frequency division multiple access (OFDMA) frames, which, when executed by a processor, performs operations comprising:
transmitting, from a base station, a first signal based on a first OFDMA frame having a MAP information element (IE) for locating a data region comprising a data burst in a starting OFDMA frame, wherein the MAP IE comprises a starting frame number of the starting OFDMA frame; and
transmitting, from the base station, a second signal based on a second OFDMA frame without a MAP IE for locating the data region comprising a different data burst in the second OFDMA frame, wherein the second signal is transmitted later than a signal based on the starting OFDMA frame.

62. The non-transitory computer-readable medium of claim 61, wherein the data region is a downlink (DL) data region and the MAP IE for locating the data region in the starting OFDMA frame is a DL-MAP IE.

63. The non-transitory computer-readable medium of claim 61, wherein the data region is an uplink (UL) data region and the MAP IE for locating the data region in the starting OFDMA frame is a UL-MAP IE.

64. The non-transitory computer-readable medium of claim 61, wherein the MAP IE contains a message comprising:
- region information for establishing a fixed position for the data region within the starting and the second OFDMA frames;
- the starting frame number; and
- an allocation interval.

65. A non-transitory computer-readable medium comprising a program for transmitting multiple orthogonal frequency division multiple access (OFDMA) frames, which, when executed by a processor, performs operations comprising:
- transmitting, from a base station, a first signal based on a first OFDMA frame having a MAP information element (IE) for locating a data region comprising a data burst in a starting OFDMA frame, wherein the MAP IE comprises a starting frame number of the starting OFDMA frame; and
- transmitting, from the base station, a second signal based on a second OFDMA frame without a MAP IE for locating the data region comprising a different data burst in the second OFDMA frame, wherein the second signal is transmitted later than a signal based on the starting OFDMA frame, wherein the MAP IE contains a message comprising:
- region information for establishing a fixed position for the data region within the starting and the second OFDMA frames;
- the starting frame number; and wherein the signal based on the starting OFDMA frame is transmitted according to the starting frame number and the second signal based on the second OFDMA frame is transmitted a number of OFDMA frames after the signal based on the starting OFDMA frame according to the allocation interval in the message of the MAP IE.

* * * * *